B. M. DES JARDINS.
TYPE WRITER ADDING MACHINE.
APPLICATION FILED NOV. 5, 1904. RENEWED OCT. 4, 1918.

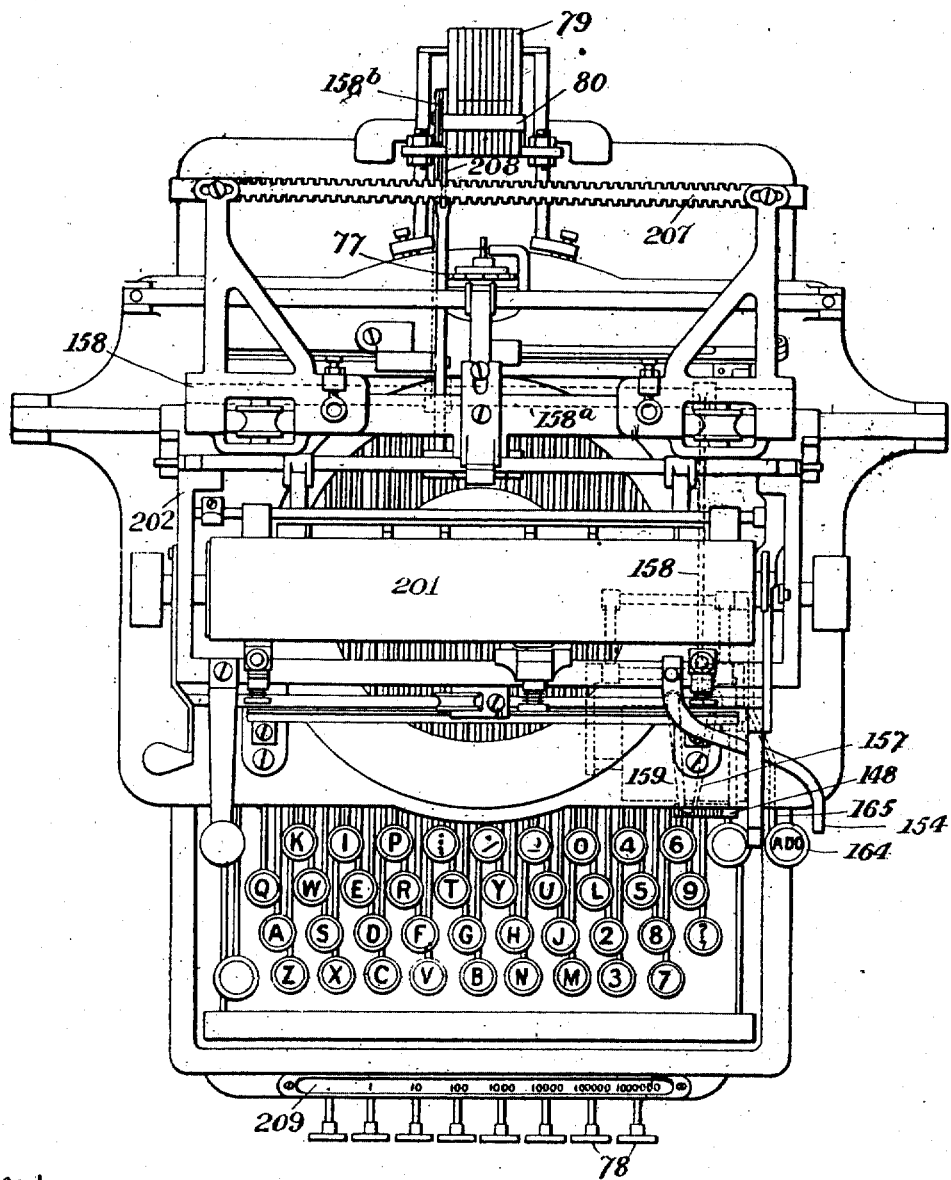

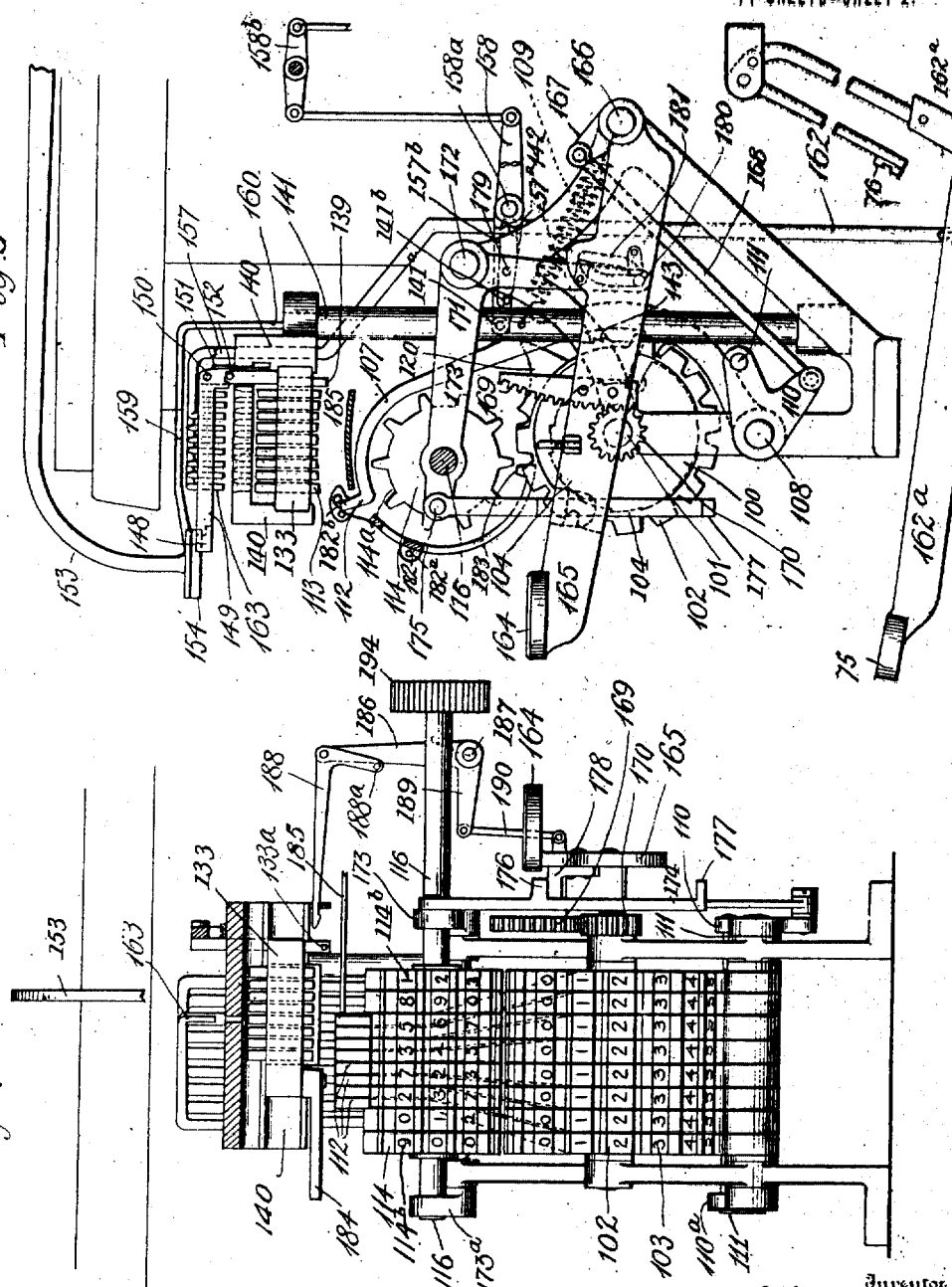

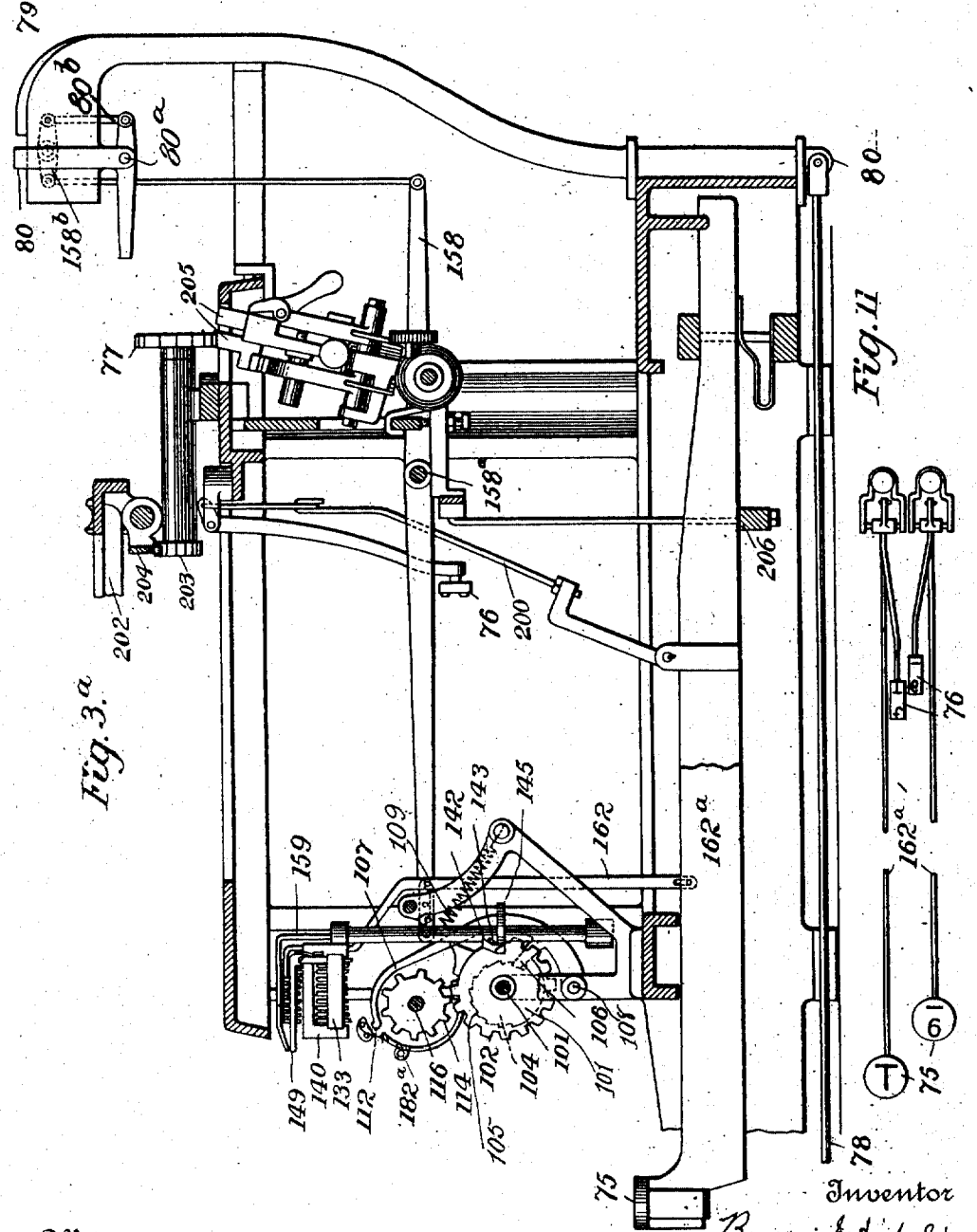

1,302,465.

Patented Apr. 29, 1919.
11 SHEETS—SHEET 4.

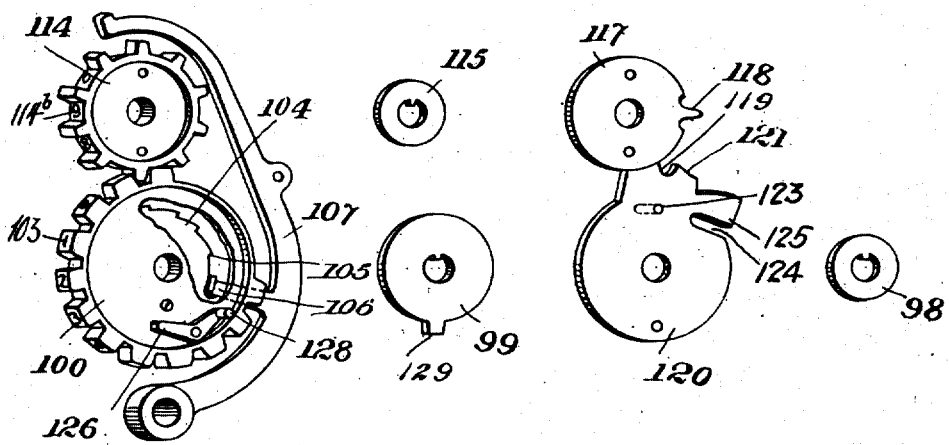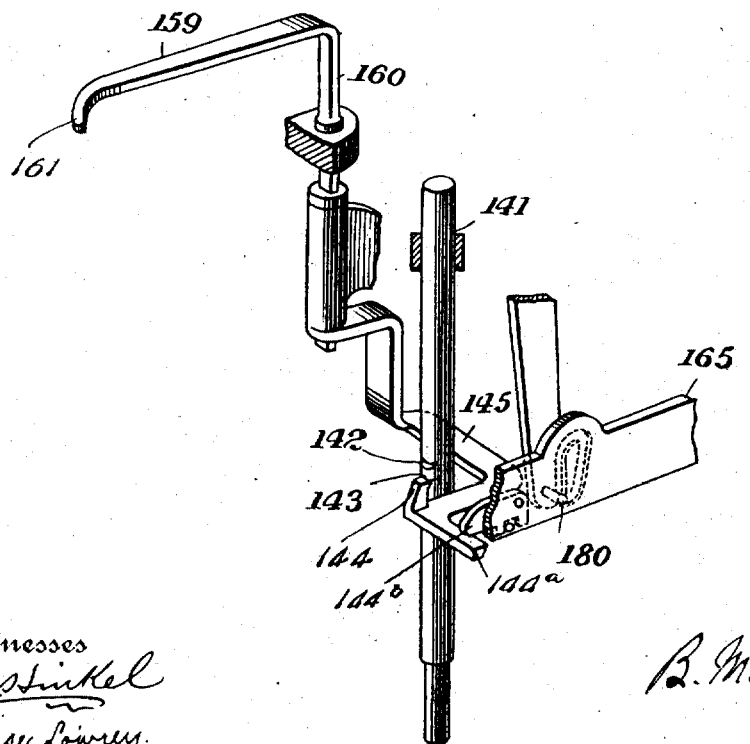

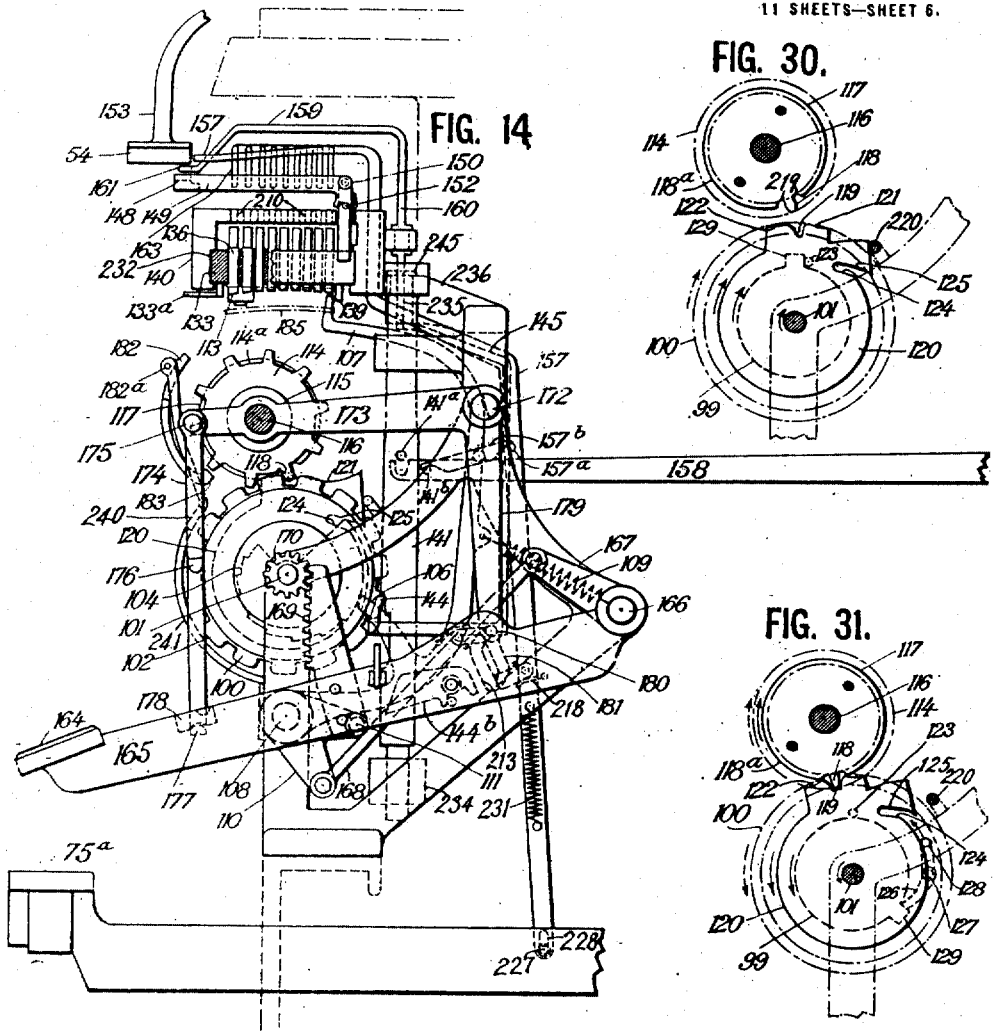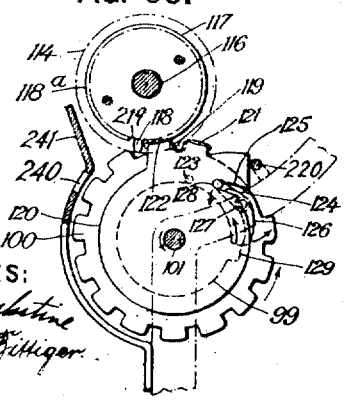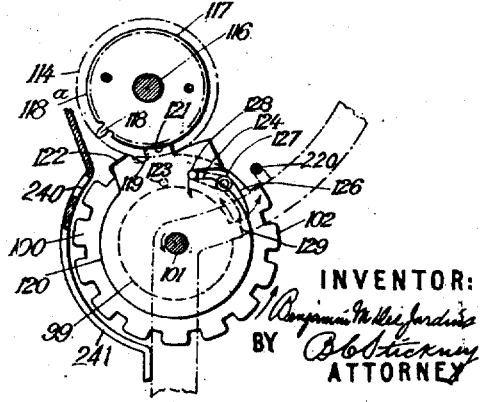

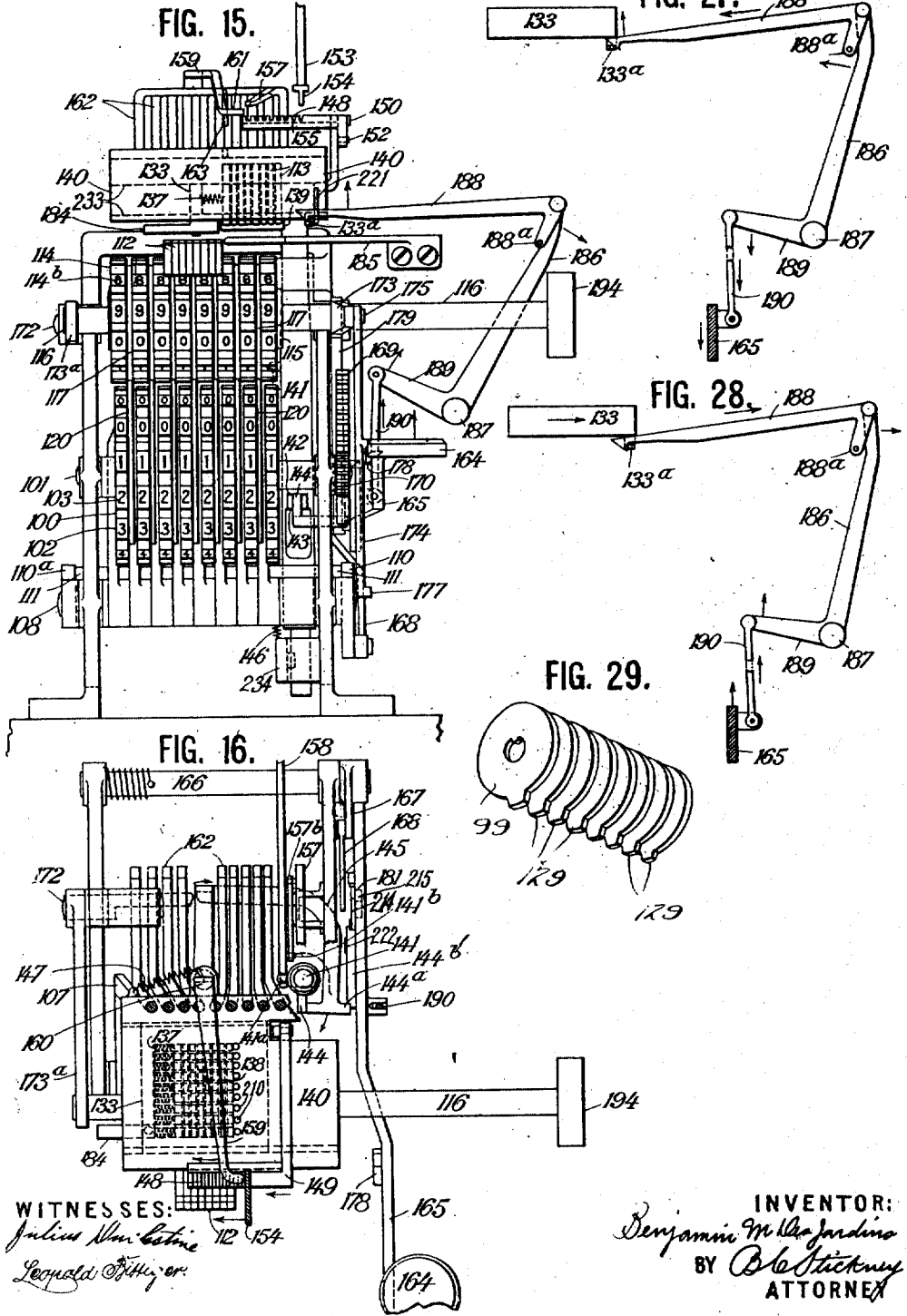

B. M. DES JARDINS.
TYPE WRITER ADDING MACHINE.
APPLICATION FILED NOV. 5, 1904. RENEWED OCT. 4, 1918.

1,302,465.

Patented Apr. 29, 1919.
11 SHEETS—SHEET 8.

WITNESSES:

INVENTOR:
Benjamin M. Des Jardins
BY
ATTORNEY

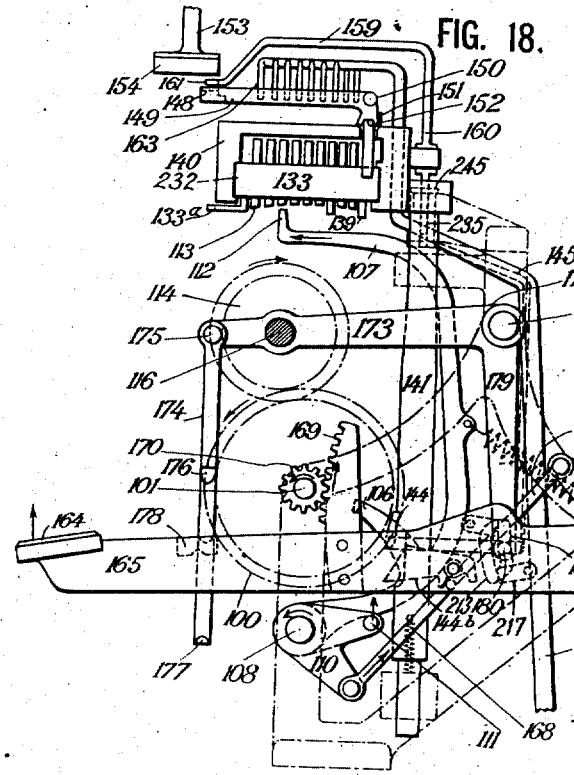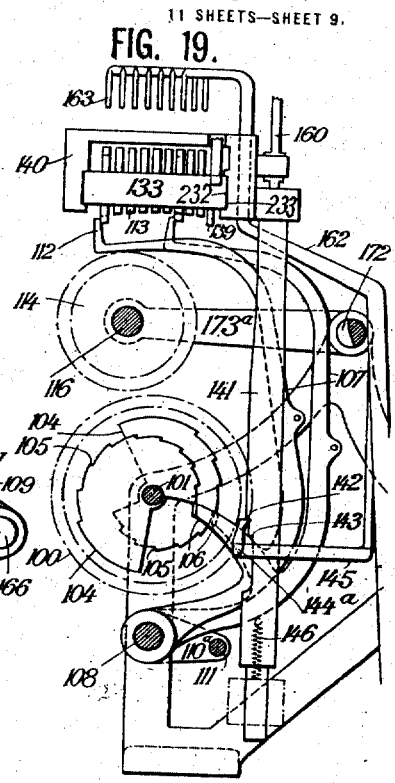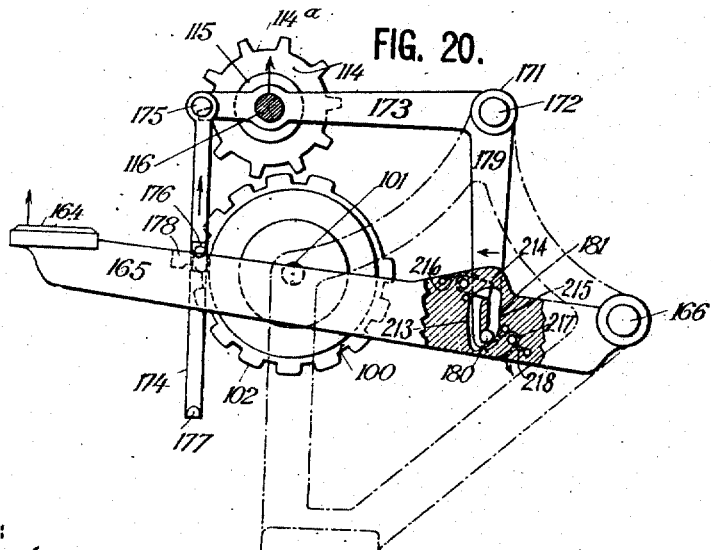

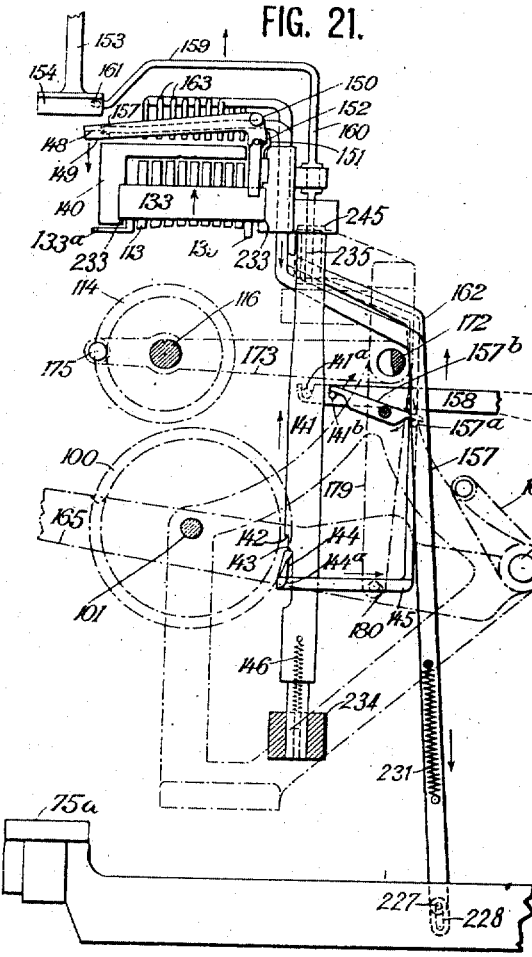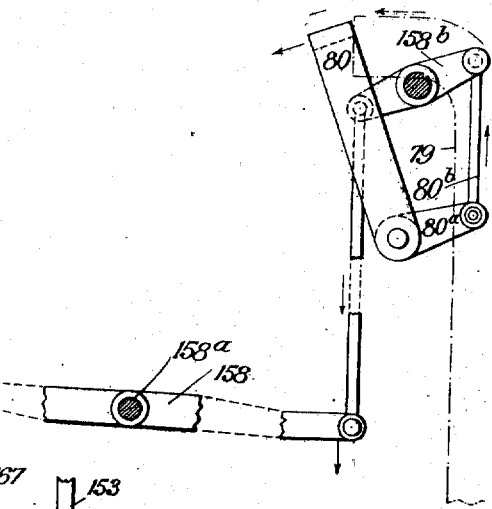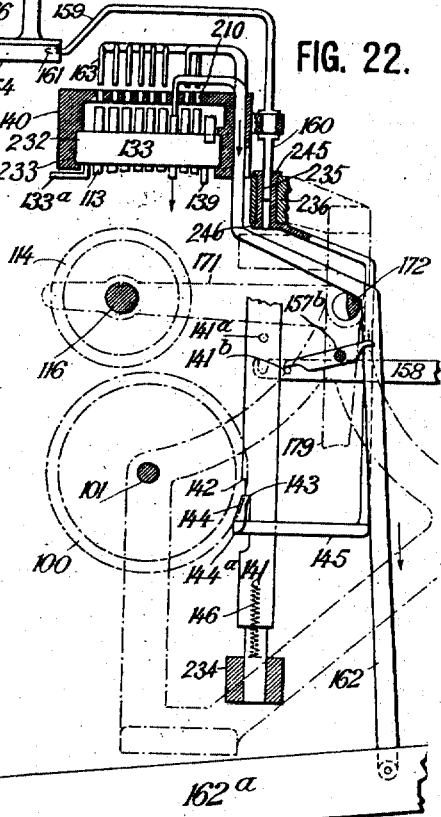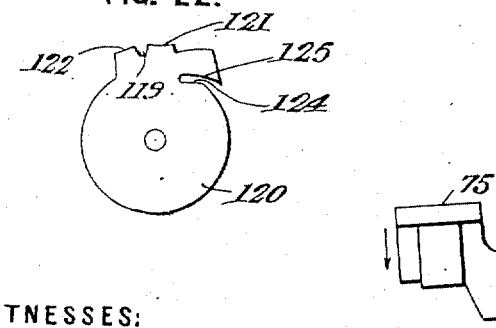

B. M. DES JARDINS.
TYPE WRITER ADDING MACHINE.
APPLICATION FILED NOV. 5, 1904. RENEWED OCT. 4, 1918.

1,302,465.

Patented Apr. 29, 1919.
11 SHEETS—SHEET 11.

WITNESSES:
Julius Dickstine
Leopold Bittiger

INVENTOR:
Benjamin M. Des Jardins
BY B. B. Stickney
ATTORNEY

UNITED STATES PATENT OFFICE.

BENJAMIN M. DES JARDINS, OF WEST HARTFORD, CONNECTICUT, ASSIGNOR TO UNDERWOOD TYPEWRITER COMPANY, OF NEW YORK, N. Y., A CORPORATION OF DELAWARE.

TYPE-WRITER ADDING-MACHINE.

1,302,465.

Specification of Letters Patent.   Patented Apr. 29, 1919.

Application filed November 5, 1904, Serial No. 231,546. Renewed October 4, 1918. Serial No. 256,782.

*To all whom it may concern:*

Be it known that I, BENJAMIN M. DES JARDINS, a citizen of the United States, residing at West Hartford, in the county of Hartford and State of Connecticut, have invented a new and useful Type-Writer Adding-Machine, of which the following is a specification.

This invention relates to computing machines, and is especially adapted to be used in combined typewriting and computing machines. The invention is shown herein as applied to a Remington typewriting machine of the basket type in which as usual, the alphabet and numeral keys operate type. Said typewriting machine, as usual, comprises a traveling carriage controlled by an escapement operated by said keys, and said carriage may be positioned by means of tabulating keys of the usual type; said tabulating keys preferably forming part of a decimal tabulator. The computing machine in one of its broadest aspects belongs to the type of machines known as item register machines, in which machines numbers are temporarily recorded, and later carried into the computing wheels proper by the operation of a general operator, or some equivalent device.

According to one aspect of the present invention, as herein disclosed, said item register comprises a series of arrays of settable pins; there being an array of such pins for each column in which a figure is written. Said pins in all said arrays, when taken together, may be termed a nest, which nest is normally in an ineffective position, so that the numeral keys operate idly with reference thereto. Said nest, however, may be moved into effective position by the operation of any tabulating key in the column in which computing is to be done. When in said effective position, said nest is carried along by the typewriter carriage by means of an arm fast on said carriage. Thus said nest will move step by step with the typewriter carriage until a numeral key writes a figure in the units place. When a numeral key rises after writing a figure in said units place, the typewriter carriage, in the usual form of escapement mechanism, moves along one letter-space, and in so moving, moves the pin nest to an ineffective position and disconnects said nest from the typewriter carriage. In the preferred form of device, as herein shown, the typewriter carriage may then feed along normally without any further effect on the computing mechanism. At any time after a number has thus been written in the units place, the numbers recorded in said pin nest may be carried into a gang of computing wheels and there recorded, while at the same time the pins which have been set are restored to their normal position, thus putting said nest in condition to have another number recorded therein.

In thus carrying numbers recorded in said pin nest into the computing wheels, said computing wheels are arranged to simultaneously operate a carry-over mechanism. To attain this and other results, the numbers recorded in the item register or pin nest are not directly carried into the computing wheels, but said pin nest controls an array of feelers which determine how far a set of intermediate wheels shall turn, and when said intermediate wheels have thus been turned they are brought into engagement with the computing wheels proper, and then in being restored to zero, turn said computing wheels to the extent said intermediate wheels were permitted to be turned by said feelers. Wherever a carry-over is to be made, said intermediate wheels turn one digit space farther, thus turning the computing wheels proper one space farther, and therefore registering a carry-over in said computing wheels.

The computing mechanism may likewise comprise means for rapidly setting the computing wheels proper to zero, thus setting them to begin a new computation.

Other features and advantages will hereinafter appear.

In the accompanying drawings,

Figure 1 is a plan view of a Remington typewriter and tabulator with the adding attachment connected.

Fig. 2 is a front elevation of the attachment with the sight-opening plate removed and the upper supporting plate shown in section.

Fig. 3 is a right elevation with minor parts broken away.

Fig. 3ª is a sectional side view including the typewriter escapement and tabulator.

Figure 4:
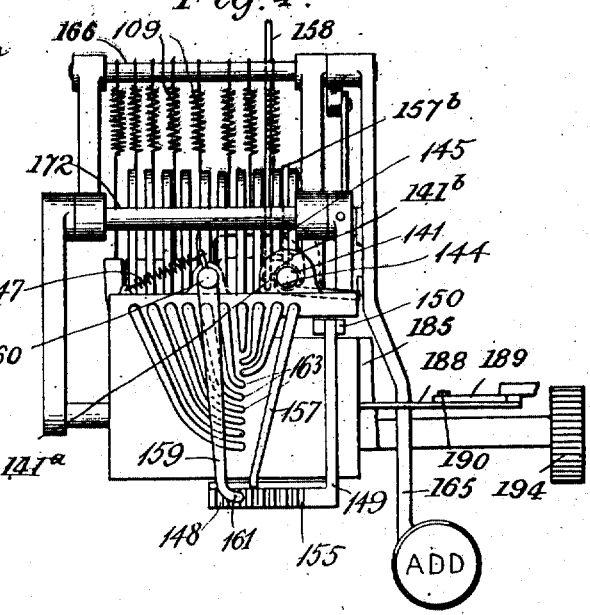

Fig. 4 is a plan view.

Figure 5:
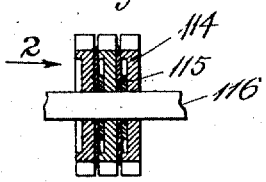

Fig. 5 is a sectional view of the totalizing disks.

Figure 6:
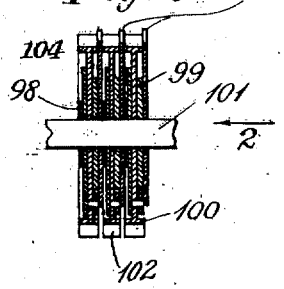

Fig. 6 is a sectional view of the numeral disks.

Figure 7:
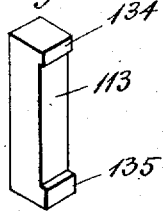

Fig. 7 shows the index frame.

Figures 8, 9:
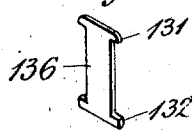

Figs. 8 and 9 show the index stop and its friction plate.

Figure 10:
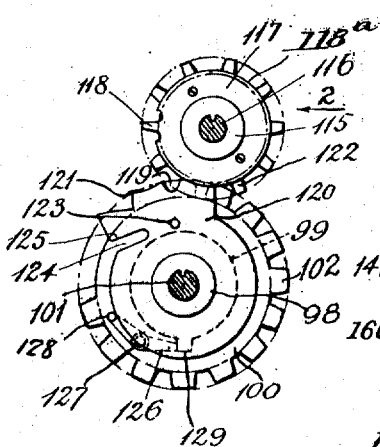

Fig. 10 shows the carrying devices.

Fig. 11 illustrates in plan type-bars and keys for operating the same.

Fig. 12 shows the intermediate wheels and carrying devices.

Fig. 13 is a detail showing the holding arm and connecting parts.

Fig. 14 shows the mechanism with the adding lever depressed to its lowest position in computing "9".

Fig. 15 is a front view of the computing mechanism when the pin nest has just reached normal position in being returned at the end of the adding operation.

Fig. 16 is a plan view showing the pin nest being released from the typewriter carriage.

Figure 17:
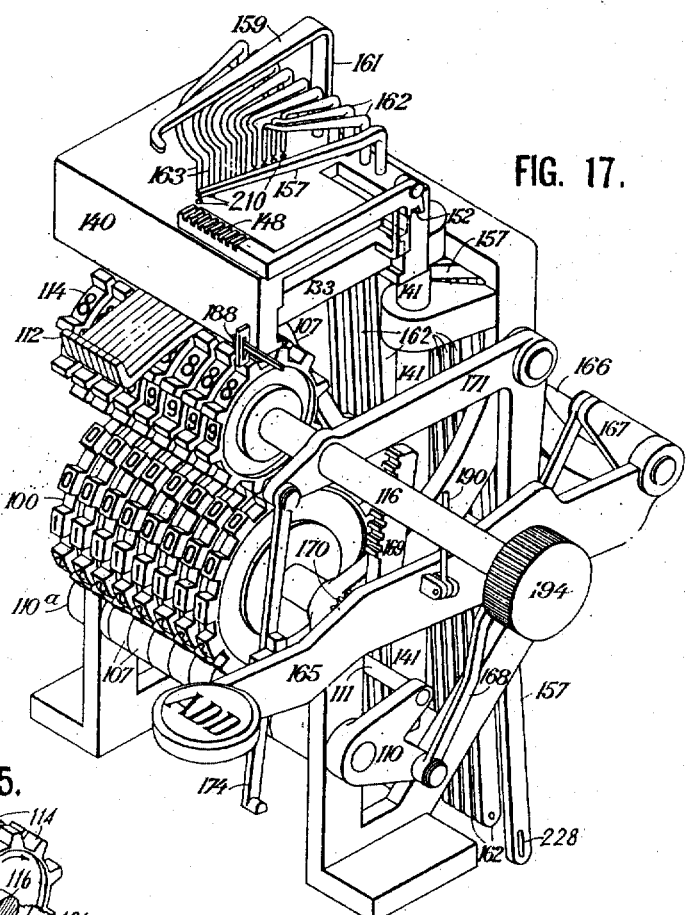

Fig. 17 is a perspective view of the adding mechanism proper in position for pin-setting.

Fig. 18 shows the parts with the adding lever part-way on its return stroke.

Fig. 19 shows the feelers computing "0" and "6" and their relation to the intermediate wheels.

Fig. 20 shows the action of a four-motion device on the up-stroke of the adding key.

Fig. 21 shows the adding mechanism in the act of being connected to the typewriter carriage.

Fig. 22 shows the action of the parts in setting pins.

Fig. 22ª is a view of a Geneva-lock plate forming part of a carry-over device. In this form, the plate resembles an ordinary Geneva-lock wheel from which all except two sections or teeth have been trimmed away. Either this form or either of the forms seen at Figs. 10 and 30 may be used for the units dial.

Figure 23:
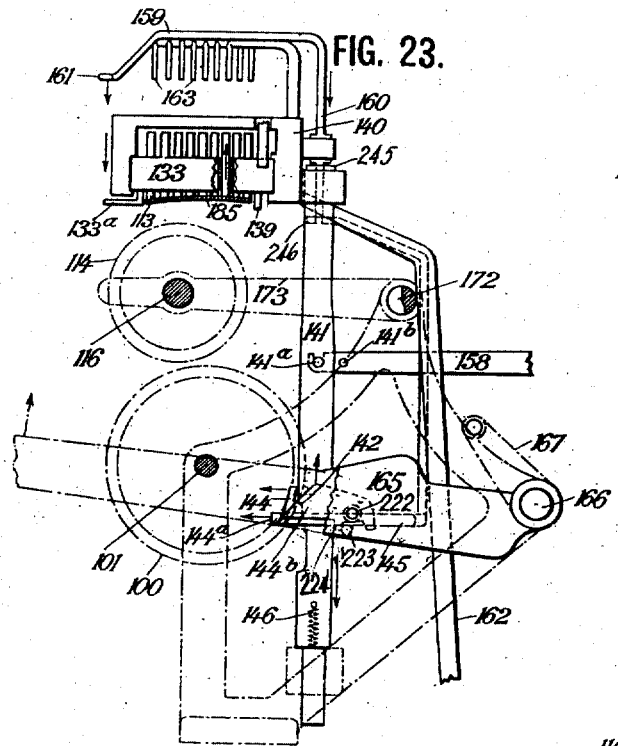

Fig. 23 shows the mechanism in the act of resetting the pins.

Figure 24:
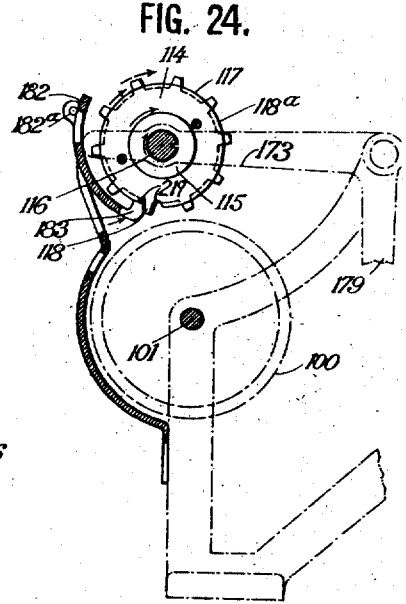

Fig. 24 shows the computing wheels being returned to "0".

Figure 25:
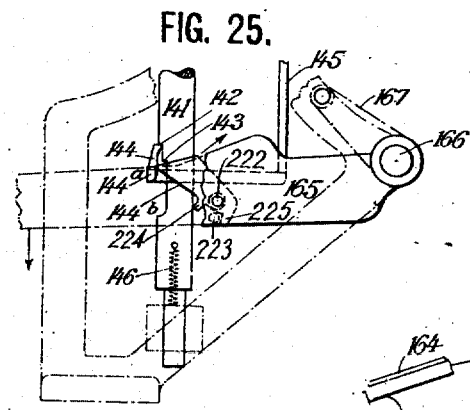

Fig. 25 is a detail showing the parts on the down stroke of the adding key.

Figure 26:
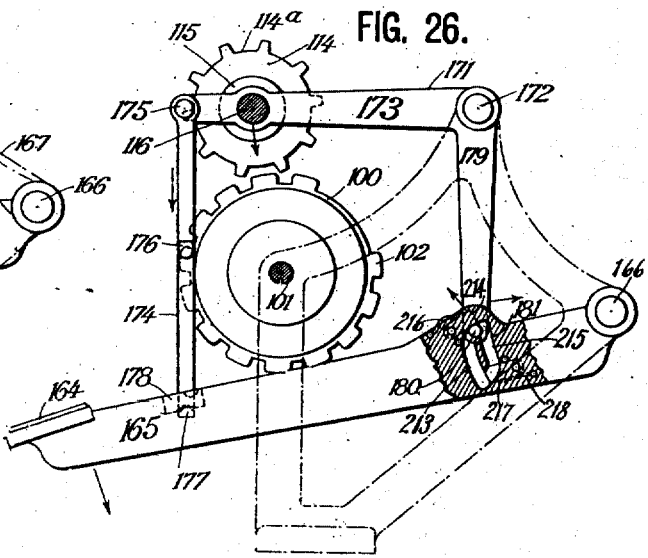

Fig. 26 shows the action of the four-motion device on the down stroke of the adding key.

Figs. 27 and 28 show the connections for returning the pin nest.

Fig. 29 shows diagrammatically in perspective a set of disks or plates with lugs thereon for operating the dials, the lugs being each cut away or set back a little in respect to the lug or lower denomination to give clearance.

Figs. 30, 31, 32 and 33 show the relation of the intermediate wheels to the computing wheels, and their mutual relation to the carry-over devices.

Figure 34:
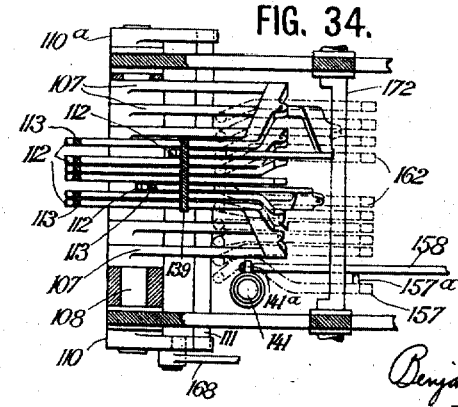

Fig. 34 is a plan view of the top of the machine when computing 9,000,600, with the pin nest removed.

Figure 35:
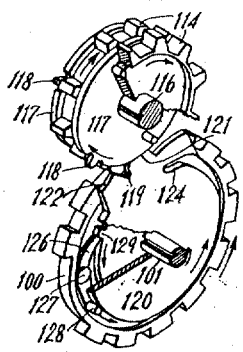

Fig. 35 is a perspective view, largely broken away, of the carry-over devices after they have partly operated.

In the ordinary Remington basket type of typewriting machine, numeral and alphabet keys 75 are mounted on key levers 162ª, which, when depressed by means of links 200, swing type-bars carrying type 76 upwardly to strike against the under side of a platen 201. Said platen forms part of the usual typewriter carriage 202, which is drawn forward in letter-feeding direction by means of a spring-barrel (not shown herein), and is controlled by means of an escapement mechanism of the usual kind. Said escapement mechanism comprises an escapement wheel 77 having fast to the axle thereof a pinion 203 working in a rack 204 on the typewriter carriage, while the escapement wheel 77 is controlled by means of dogs 205 which are vibrated at each depression of a key lever 162ª by means of a universal bar 206 in the usual manner.

Said typewriter carriage 202 comprises a rack bar 207 or which may be set stops 208 adapted to coöperate with key-operated counter-stops 79 in the usual manner; said counter-stops being in the form of upstanding levers to which are pivoted at their lower ends forwardly extending key rods 78 having finger-pieces on the front thereof. Said counter-stops 79 are spaced at letter-space intervals, and, as will be seen from Fig. 1, a scale bar 209 shows in what denomination in a given column the stop controlled by each key will arrest said carriage.

The parts so far described form the usual parts of the standard Remington machine. To use said machine for computing, it is provided with a pin nest 133 in which pins are set (viz. depressed) by the various numeral keys as they are operated in predetermined columns, and the numbers represented by the pins so set are later carried into computing wheels 114 in a manner hereinafter described. Said computing wheels 114 bear numerals 114ª in the broad flat spaces 114ᵇ between their teeth. For thus registering numbers, the pin nest includes a series of settable pins 113, there being nine pins in each array, so that pins in each array represent the numbers from "0" up to and including "8" in a given column. These pins 113 are held between partition plates 138 extending across said pin nest so that all the "0" pins are in front of the first partition plate; all the "1" pins are between the first and second partition plate, etc.

Said pins are set by being depressed in a manner hereinafter described by the various numerals, and said pins are frictionally held either in their normal or their set position by means of springs 137, there being one spring for each row of pins between every two partition plates (see Fig. 7).

The pins on one array are separated from those on the next by means of division plates 136 which are adapted to be slipped in between the partition plates 138, and comprise shoulders 131 and 132 which prevent the division plates from slipping out from between the partition plates. Thus it will be seen that each spring 137 presses a row of alternated pins and plates. Each pin 113 comprises a top shoulder 134 and a bottom shoulder 135, which shoulders are so spaced as to allow some play up and down between the partition plates, but at the same time prevent the pins from slipping from between the plates.

Said pin nest 133 is normally in an ineffective position. When, however, a tabulating key 78 is operated, the counter-stop operated thereby is arranged to move said pin nest into effective position. For this purpose, the counter-stops 79 are arranged to strike a universal bar 80 on their forward stroke, as seen in Fig. 21, which universal bar 80, by means of a bell crank arm 80ᵃ fast to the axle thereof through a link 80ᵇ, rocks a walking beam 158ᵇ so as to press downwardly the rear end of a lever 158 pivoted at 158ᵃ and extending forwardly to the computing device, so that the front end of said lever will rise and lift a pillar 141 by a pin 141ᵃ, which pillar supports the sliding pin nest 133 by means of a frame 140. Said pillar 141 is guided in a fixed slide 234, and together with said frame 140 and pin nest 133, is supported (Figs. 13, 21 and 22) in its raised position by means of a pawl 144 which a spring 147 (Figs. 4 and 16) causes to catch under a tooth or ledge 143 near the lower end of said pillar. In this raised position of the pillar 141 and pin nest 133, a rack 148 connected to the pin nest 133 normally engages a blade 154 on an arm 153 extending forwardly from the typewriter carriage, as seen in Fig. 3, (see also the top of Figs. 14, 15, 18 and 21). Said rack 148 therefore carries the pin nest 133 along the frame 140 as the typewriter carriage is drawn along in letter-feeding direction. The tooth of the rack 148 engaged by the blade 154 determines in what denomination computing will begin.

To enable the pin nest 133 to slide, it has (Figs. 3 and 14) the edges 232 of its frame formed as slides which travel in ways 233 in the frame 140. In being thus drawn along, the array of pins on said rack are successively brought under a row of fingers 163 which (see Figs. 3, 17, 18, 21 and 22) project downwardly toward said pins through openings 210 in the frame 140, each of said fingers 163 being attached to a numeral key by means of a downwardly extending link 162, (Figs. 18, 19, 22 and 23) with the result that whenever a numeral key is depressed, its finger 163 (as seen in Fig. 22) will move downwardly a pin 113, as shown by the arrow in said figure. For reasons hereafter described, the "0" key sets pins 113, but the "9" key requires no pin, and so operates no finger 163.

As a numeral key rises, the typewriter carriage will be fed forward by means of the escapement mechanism and the arm 153 on said carriage will draw along the pin nest 133, thus bringing another array of pins under the openings 210 so that any numeral key now depressed will set a pin 113 in the next array in said nest.

When a numeral key has been depressed to record numbers in each array until the units array of pins in said nest is reached, the rising of the key will, as in the case of the other arrays, cause said pin nest and typewriter carriage to feed forward one letter-space, but in feeding forward from the units column, the blade 154, which has been described as fast on the typewriter carriage, strikes the extension 161 of a rock arm 159, which arm forms part of a vertical shaft 160 (see Figs. 3, 15, 16, 17 and 31), said shaft being connected at its lower end to the pillar supporting pawl 144, so that the swinging of the shaft 160 will swing the pawl 144 clear of the first ledge 143 on the pillar 141 and allow said pillar to drop until said pawl catches the ledge 142 on said pillar, thus carrying down the pin nest 133 and with it the rack 148 (to the position seen in Fig. 18) so that said rack 148 is free from the blade 154 and therefore is no longer carried along by the typewriter carriage. Any further operation of any keys of the typewriter will have no effect on the computing mechanism, while the numbers registered in the column as just described may be carried at the operator's convenience into the computing wheels proper, said numbers having been registered in the pin nest by the setting of pins therein.

The computing wheels proper 114, as has been stated, are turned by means of intermediate wheels 100, said intermediate wheels being first turned to an extent determined by the pins set in said pin nest, and then after being engaged with the computing wheels proper, said intermediate wheels are turned back to zero, thereby carrying the numbers recorded in them into the computing wheels proper. For turning the intermediate wheels to an extent determined by the various pins set, there is provided a general operator or adding key 164 on a lever 165 pivoted on the frame, which key normally stands in its uppermost position and is manually depressed to operate the intermediate wheels and also the computing wheels proper.

It was stated above that when a numeral 5 was written in the units column, the pin nest 133 was dropped clear of the blade 154. This drop brings the depressed pins 113 (as best seen in Figs. 14, 18 and 19) into the path of fingers 112 forming parts of arms 107 journaled at the bottom of the frame on a shaft 108, and said arms, in a manner hereinafter described, determine how far the above-described intermediate wheels shall be turned; said fingers 112 being swung rearwardly by the depression of the adding key 164 until they are arrested in various positions by the depressed pins 113, as seen in Figs. 14, 19 and 34. The bottoms of the pins 113 normally lie on an arc, so that the lower ends of the pins not depressed form the arc of a circle just clear of the fingers 112. Said arms 107 at their bases, as best seen in Figs. 2 and 34, are spaced apart the same distance as the intermediate wheels 100, so that extension dogs 106 on said arms (whose purpose is hereinafter described) will lie between said intermediate wheels, but at their upper ends, at the fingers 112, said arms are bent together so that said fingers aline with the arrays of pins 113. The spacing of the pins 113 conforms to the letter-spacing of the typewriter, therefore, the wheels 100 and the arms 107 are spaced at greater distances than said letter-spacing.

Said arms 107 are journaled on shaft 108 and are normally held in the forward position (seen in Fig. 3) by means of a transverse swinging rod 111 fast on rock arms 110, 110ᵃ near the base of said arms. This rod 111 (see Figs. 14 and 19) at the depression of the adding key 164 is moved clear of the arms 107, thus permitting each spring 109 to draw its arm 107 rearwardly until arrested, as above described, by its depressed pin 113. The connections between the adding key 164 and said rod 111 include a bell crank 167 fast on the shaft 166 of said adding key, which bell crank, by means of a link 168, is pivotally joined to a rock arm 110 fast on shaft 108, which shaft has fast thereon arms 110, 110ᵃ carrying the rod 111. On being depressed, the adding key 164 is arranged to frictionally rotate the intermediate wheels 100 until said wheels are arrested by means of the arms 107, and the amount of said frictional rotation depends on the extent to which said arms 107 allow said intermediate wheels 100 to be turned. To bring about this result, as the adding key lever 165 descends, a rack 169 fast thereon (Fig. 14) engages a pinion 170 fast on the shaft 101 on which the intermediate wheels 100 are journaled. The intermediate wheels 100, while journaled on said shaft 101, have considerable tendency to turn therewith, each being frictionally engaged on opposite sides by a washer 98 and a plate 99, both of which are keyed to said shaft (see Fig. 6).

As seen in Fig. 6, each plate 99 lies against a thin web forming the hub of its computing wheel, and the periphery of each computing wheel is broad so that the washers 98 and plates 99 are behind said periphery. Normally said intermediate wheels 100 therefore turn with the shaft 101. Each intermediate wheel 100 has fast thereon a stepped plate 104, which plate, by coöperating with its arm 107 is adapted to arrest its intermediate wheel as said shaft 101 tends to turn said wheel. The means for thus arresting said plate 104 and wheel 100, comprise a series of steps 105 on the plate 104, said steps being nine in number. Said steps are arranged to coöperate with extensions 106 reaching from the arms 107 between the wheels 100, so that if a finger 112 is held against moving rearwardly when the adding key 164 is operated, its extension 106 will prevent its plate 104 from turning at all, and therefore will prevent the intermediate wheel belonging to said plate 104 from turning. This is best shown in full lines in Fig. 19, as viewed in said figure. If, however, the finger 112 moves backward as the farther finger in said Fig. 19 is shown as doing, then the extension 106 on said finger will permit the stepped plate 104 to turn until a step 105 thereon strikes its extension 106 and is arrested thereby. As shown in said Fig. 19, the rear finger 112 is thus arrested at the point at which it will record "6" in its intermediate wheel. When the adding key is thus depressed to its full extent, the numbers registered in the pins 113 will be displayed at 103 on the intermediate wheels through the sight-opening 240 in the cover plate 241 which is fast to the frame of the machine. Said numbers, as shown in Figs. 2, 14 and 15, are on the broad ends of the teeth 102 of the wheels 100.

In this connection it should be noted that when the front pin 113 is depressed in any array in the pin nest 133, said pin will record "0," while if no pin is depressed in any array, the finger 112 of that array will swing rearwardly until it strikes a stop bar 139 (see Figs. 14 and 34) extending entirely across the pin nest 133, and when against said bar 139, the number "9" will be recorded because in said position the extension 106 of said finger 107 will permit its intermediate wheel to make nearly a full revolution and so record "9" on said wheel.

The fingers 112, which are of higher denomination than any pin which has been set by the operation of a numeral key, are prevented from swinging rearwardly by a bar 184 (see Figs. 7, 15 and 16) which extends beneath the pin nest 133 to the left of the pins. This prevents a number from being recorded which has not been written and registered by the setting of a pin 113.

So far the action of the adding key 164 has been described in its movement of depression, and said movement has been without effect on the computing wheels proper 114. As said adding key 164 approaches the bottom of its stroke, its key lever 165 strikes an arm 177 of a depending link 174, which link is pivotally attached at 175 to the arms 173, 173ª, on which the computing wheels 114 are carried by means of their shaft 116; said arms 173, 173ª being fast to a shaft 172 journaled on the frame. Thus, as said adding key approaches the bottom of its stroke (see Fig. 14), it positively moves said computing wheels 114 into mesh with the intermediate wheels 100, which intermediate wheels have just been rotated to an extent determined by the pins 113 of the pin nest 133.

Said computing wheels have hitherto been positively held out of mesh with said intermediate wheels 100. They were so held by means of a four-motion device 181 comprising cams 213, 215 on the adding key lever 165. These cams engage a pin 180 fast on a bell crank arm 179 forming part of the frame 171 which includes the arm 173 and the shaft 116 on which the computing wheels proper are journaled. Said pin 180 normally occupies the position seen in Fig. 3 in the front cam 213, and during the depression of said key lever 165, said pin 180 rides in said forward cam (Fig. 26), which cam is struck from the shaft 166 of the key lever 165 as a center, and so holds said computing wheels in their upper position clear of the intermediate wheels 100. When said adding key lever 165 draws down the computing wheels proper 114 by means of the link 174, as seen in Fig. 26, it swings the pin 180 past the end of the cam 213, so that it catches behind a latch 214, as seen in Fig. 26, thus locking said arm 179 into position where it will be engaged by the rear cam 215 of said four-motion device 181, and thus said pin 180 will lock said computing wheels 114 in mesh with the intermediate wheels 100.

Said latch 214 is held in position by means of a spring 216, so that the pin 180 cannot escape past it. The cam 215 is struck from shaft 166 as a center, and so holds the computing wheels 114 (Fig. 18) in mesh with the intermediate wheels throughout the up-stroke of the adding key lever 165. At the end of the up-stroke, said adding key lever brings its lug 178 against the arm 176 of the link 174, thus raising the computing wheels 114 clear of the intermediate wheels 100, and at the same time swinging the crank arm 179 to its normal position, as seen in Fig. 3, where it is held by means of a latch 217 corresponding to the latch 214; said latch 217 being held in position by means of a spring 218. Said latches 214 and 217 are so curved at their ends that they form extensions of the cams 213 and 215.

It is during the up-stroke of the adding key lever 165 that the numbers are carried from the intermediate wheels 100 into the computing wheels 114. This is done by means of the rack 169, which, on its upward stroke, rotates the pinion 170 backwardly so that the plates 99 and washers 98 thereon will turn their intermediate wheels 100 backwardly from the position in which they were arrested by the extensions 106 into their normal position of rest. Since this turning takes place while the computing wheels 114 are in mesh with said intermediate wheels, the turning of said intermediate wheels rotates the computing wheels so as to carry into said computing wheels the number which has been transferred from the pin nest 133 to the intermediate wheels.

The washers 98 and plates 99, it will be remembered, are fast on the shaft 101, and means are provided for causing said plates to positively turn the intermediate wheels 100 to the extent determined by the extensions 106, and then to turn idly. To thus positively turn its intermediate wheel, each plate 99 has a lug 129 thereon (Figs. 12, 29 and 35) which lies (Figs. 31 and 35) in the normal path of a pawl 126, which pawl is pivoted at 127 on its intermediate wheel 100. Said pawl is normally held in the path of said lug 129 by means of a carry-over plate 120, the surface of said carry-over plate, as best shown in Fig. 35, forming a cam surface on which a pin 128 fast on the tail of said pawl 126 rides. Thus, so long as the periphery of said carry-over plate 120 holds the pawl 126 in the path of the lug 129, said lug will drive said intermediate wheel by means of the pivot 127 on which its pawl 126 swings. Each lug 129 may be made a little thinner than the lug of lower denomination, as at Fig. 29, to give clearance for the proper engagement of pawl 126 therewith.

Said pawl 126 is positively moved to ineffective position out of the path of the lug 129 when a number is completely carried into the computing wheel 114 engaged by its intermediate wheel 100. Said pawl is thus moved to ineffective position when (Fig. 33) the intermediate wheel 100 has been turned until the zero on its periphery is at the sight-opening 240. At this time, pin 128 moves said pawl out of the path of the lug 129 because the pin 128 rides down on an incline 124 forming a cam extension of the periphery of said carry-over plate 120, thus swinging the tail of said pawl to the point seen in Figs. 32 and 33, where the lug 129 will move idly past said pawl. Said pin 128 is forced down said cam 124 by means of an overlying cam surface 125 formed on an extension of said carry-over plate. Therefore, the plate 99, after turning its intermediate wheel back to zero, may turn idly to any extent.

These carry-over plates 120 are journaled on the shaft 101, and are normally in the position seen in Fig. 33, each with a part 122 forming an extension or tooth upon said carry-over plate, projecting to position to be engaged by disk 117 when the latter drops to the position seen at Fig. 33, whereby the tooth 118 is enabled to set the plate 120 to carry-over position.

The plates 120 have been called carry-over plates because they control the carrying-over operation to the computing wheel next higher in denomination whenever a computing wheel brings its zero to its sight-opening. Each of said carry-over plates is held against rotation by a plate or disk 117 fast on the computing wheel 114 next lower in denomination. For this purpose the extension 122 of each carry-over plate forms a Geneva lock with the plate 117 of said computing wheel next lower in denomination (Fig. 33). When, however, the computing wheel 114 turns its zero to its sight-opening, a carry-over tooth 118 of the disk 117 fast to its computing wheel 114, turns said carry-over plate 120 through the position seen in Fig. 31 to the position seen in Fig. 32, where said carry-over plate is held against further turning by means of a Geneva lock member 121 forming an extension of said carry-over plate which locks itself against the disk 117, as best seen in Fig. 35. As will be seen in said Fig. 35, the carry-over plate 120 has been turned so that it is held by its Geneva lock member 121, and said Geneva lock member is locked against the disk 117 of the computing wheel 114 in the foreground, while the carry-over plate 120 is holding the pawl 126 of the intermediate wheel 100, which intermediate wheel engages the computing wheel 114 seen in the background in said figure. Thus, the carry-over plate 120 is locked against the computing wheel seen in the foreground, and thereby controls the computing wheel seen in the background. To put it another way, the computing wheel lower in denomination by its carry-over plate controls the computing wheel next higher in denomination.

It will be seen that this turning of the carry-over plate 120 has moved the inclined cam 124 from the position seen in Fig. 33 to the position seen in Fig. 32. The result of this is that the pawl 126 is held in the path of its lug 129 longer in said Fig. 33 than it is in Fig. 32, and therefore the intermediate wheel carrying said pawl and computing wheel driven thereby are both turned one unit space further under the conditions shown in Fig. 32 than they are in Fig. 33.

In other words, the moving of said inclined cam 124 moves the computing wheel of higher denomination one unit space further, thereby making a carry-over on said wheel. In order to permit this Geneva carry-over operation to take place, there is a cut-away portion 219 immediately adjoining each side of the carry-over tooth 118. From the above description, it will be seen that the carry-over takes place during the actual transfer of numbers from the intermediate wheels to the computing wheels proper. When the turning of the intermediate wheels 100 is completed, each of said wheels will display its zero through the sight-opening 240.

The carry-over plates 120 are positively returned to their normal positions (Figs. 30 and 33) by the lugs 129, which lugs, during the depression of the adding key, rotate the plates 99 around until said plates strike pins 123 on the carry-over plates 120, as seen in Fig. 30. Said carry-over plates 120 are held against overthrow by means of a stop-bar 220 against which they normally rest when the mechanism is at rest.

In addition to transferring numbers from the pin nest 133 to the computing wheels proper through the arms 107 and the intermediate wheels 100, the adding key is also arranged to restore the pins in the pin nest 133 to their normal position so that the computing mechanism may be set thereby to register another number. For this purpose, after the adding key lever 165 has been depressed and returned sufficiently to operate all the intermediate wheels 100, it is carried up still farther so as to draw the pin nest 133 back from the position where it has been carried by the typewriter carriage to its normal position, as shown in Fig. 15. This is accomplished by means of a link 190 which is pivotally attached to said adding key lever 165, said link drawing downwardly a bell crank 189 pivoted at 187 so that an upwardly-extending arm 186 thereon will swing a hook 188 pivoted thereto to the left.

On the return stroke of said adding key lever 165, said hook 188 will catch on a pin 133ª fast on the pin nest 133 (Fig. 28), and draw said pin nest back to the position seen in Fig. 15. Said hook 188 is swung clear of the pin 133ª at the very end of its return stroke by means of its bell crank arm which carries a pin 188ª, said pin striking against the upper side of the bell crank arm 186, so that when said bell crank arm 186 is about in its outermost position (seen in Fig. 15), the hook 188 will just clear the pin 133ª. Said hook 188 is carried through a guide plate 221 which prevents it from falling below the pin 133ª if said pin is some distance to the left, as seen in Fig. 28.

When said hook 188 has drawn the pin nest 133 to its normal position seen in Fig.

15), the pins are restored by permitting said pin nest to drop onto a plate 185. To bring about this result, means are provided for releasing the pawl 144 which now supports the pillar 141 by the ledge 142 (see Figs. 21 and 22), and therefore supports the pin nest 133. To do this, the adding key lever 165 is provided with a dog 144$^b$ which, on the down stroke of said adding key, swings idly past said pawl 144, as seen in Fig. 25. Said dog 144$^b$ is pivoted on the adding key lever 165 by means of a pin 222, and has its throw limited by means of a pin 223 which lies between lugs 224 and 225 on said dog. On the up-stroke of the adding key lever (Fig. 23) said dog 144$^b$ at the very end of said upward stroke strikes the base 144$^a$ of the pawl 144, and, having its further throw prevented by the lug 224 which strikes the pin 223, the dog 144$^b$ throws the pawl 144 clear of the pillar 141, thereby allowing said pillar to be drawn down by the spring 146, and said pillar falls, bringing the pins 113 against the plate 185, thus positively moving all the pins to their normal ineffective position. Whenever desired, the operator may manually lift the frame 140, by grasping or touching the same, and carry it up to either intermediate position or uppermost position; and the pawl 144 will hold the frame in either position.

As is best shown in Figs. 17, 18, 21 and 22, the rock arm 159 is pivotally mounted on the frame 140 which moves the pin nest 133 into and out of effective position. The result of this is that when said pin nest drops from the position seen in Fig. 21 to the position seen in Figs. 14, 18 or 19, the rock arm 159 is carried clear of the blade 154 fast to the typewriter carriage, so that the typewriter carriage may be moved freely backward and forward without any interference with the computing mechanism. Said rock arm 159 is slidably splined by its vertical shaft 160 at 235 (Fig. 22) to the pawl-carrying arm 145, so that, though the arm 159 rises and falls with the pillar 141, the pawl arm 145 swings around a fixed bearing 236. Said fixed bearing is engaged by collars 245 and 246 on the pawl arm 145, and therefore the upper collar 245, through the pawl 144, supports the pillar 141 and the pin nest 133.

The pin nest 133 has been described as being carried along by the typewriter carriage through the medium of a rack 148. Said rack is carried on an arm 149 pivotally attached to said pin nest at 150, and is normally held against the blade 154 on the typewriter carriage by means of a spring 151. In order to prevent said rack from prematurely meshing with the blade 154 when the tabulating keys are operated to position the pin nest 133 relatively to the typewriter carriage, said rack is held clear of the blade 154 (Fig. 21) during the major part of the operation of said tabulator keys by means of a link 157. The connections between said link 157 and the tabulator keys include a pin 157$^a$ fast on said link and a lever 157$^b$ which overlies said pin, and is so pivoted that the front end of said lever overlies a pin 141$^b$ on the forwardly-extending lever 158 forming the connection between the tabulator keys and the pin nest mechanism. The result is that whenever a tabulator key rocks the lever 158, it draws downward the link 157 by means of the lever 157$^b$, thus positively holding the rack 148 clear of the blade 154 until the operation of said tabulator key is nearly completed. The link 157 is normally held upward by a spring 231. Excessive throw of the rack 148 is prevented by a pin 152 (Fig. 3) which lies between lugs on a bell crank extension of said rack.

Said link 157 is also used for enabling punctuation points, such as commas, to be inserted at any point without having to vary the arrangement of the pin nest. For this purpose, the comma key 75$^a$ (Figs. 14 and 21) is connected to the link 157 by means of a pin 227 working in a slot 228 in such a way that the operation of said link 157 by the tabulator keys allows said link to move idly with respect to said comma key, but yet when said comma key is depressed, it will draw down said link 157 positively, and thereby disconnect the pin nest 133 from the blade 154, with the result that in the letter-feeding of the typewriter carriage caused by said key, the pin nest is not affected.

Means are provided for setting the computing wheels proper to zero whenever desired. To accomplish this, the cover plate 182 of the computing wheels proper is pivoted at 182$^a$ on the cover plate 241, and said plate 182 comprises lugs 183 which normally lie outside of the path of said computing wheels. If said cover plate 182, however, is swung rearwardly and upwardly against the tension of a spring 182$^b$ which normally holds it, the lugs 183 lie in the paths of the carry-over teeth 118 on said computing wheels. If, now, said computing wheels are turned until they are arrested by said lugs 183, the wheels will bring all their zeros before the sight-opening. For thus turning said wheels, the wheels are journaled on a shaft 116, and are held spaced on said shaft by means of washers 115 which are keyed into said shaft (Figs. 5, 10 and 12). The friction that these washers give said wheels is not sufficient to materially interfere with their being turned by the intermediate wheels 100, but is sufficient to enable said wheels to be turned when the shaft 116 is rotated by means of the knurled head 194 thereon.

Variations may be resorted to within the scope of the invention, and portions of the improvements may be used without others.

What I claim is as follows:—

1. In a typewriter provided with an adding mechanism, the combination comprising a series of letter and figure types, keys for the same, a carriage, a mechanism controlled by each of the said keys for moving the carriage letter and figure distances, a set of numeral disks having indicators to designate the particular figure keys operated upon, a controller for said indicators having series of stops, a series of totalizing disks and means to successively transmit thereto such numbers as have been indicated on the numeral disks.

2. In a typewriter provided with an adding mechanism, the combination comprising a series of letter and figure types, keys for the same, a carriage, a mechanism controlled by each of the said keys for moving the carriage letter and figure distances, a series of adjustable stops, means to adjust said stops in accordance with the depression of the figure key, totalizing disks and numeral disks each having indicators means to cause the said numeral disks to turn simultaneously and designate the particular figure-keys operated upon and means to transmit the same to said totalizing disks.

3. In a typewriter provided with an adding mechanism, the combination comprising a series of letter and figure types, keys for the same, a carriage, a mechanism controlled by each of the said keys for moving the carriage letter and figure distances, a longitudinally movable bar operated by said key, a downwardly turned projection on said longitudinally movable bar, a series of stops, means to cause the longitudinal motion of said bar to successively displace a series of stops and means to cause said stops to locate a totalizing disk for the purpose of indicating the action of said typewriter key.

4. In a typewriter provided with an adding mechanism, the combination comprising a series of letter and figure types, keys for the same, a carriage, a mechanism controlled by each of the said keys for moving the carriage letter and figure distances, a series of stops, a connection with the carriage to impart a step by step motion to said stops synchronously with the step by step motion of the typewriter carriage and means to arrest the step by step motion of said stops when required without arresting the step by step motion of the typewriter carriage.

5. In a typewriter provided with an adding mechanism, the combination comprising a series of letter and figure types, keys for the same, a carriage, a mechanism controlled by each of the said keys for moving the carriage letter and figure distances, a series of stops, means to adjust the said stops in accordance with the particular figure-keys depressed, numeral and totalizing disks different distances apart than said stops and a series of offset arms to contact with both said stops and said series of numbered wheels.

6. In a typewriter provided with a computing mechanism, the combination with a series of letter and figure types and keys with connections to said types, of a carriage mechanism adapted to be actuated letter space distances under the control of each of said letter and figure keys, a computing mechanism including a member adapted to be set for denominational and figure values, numeral and totalizing disks in mesh therewith, carrying devices for said totalizing disks having means to simultaneously and positively carry all of the required figure values represented on said member.

7. In a typewriter provided with a computing mechanism, the combination with a series of letter and figure types and keys with connections to said types, of a carriage mechanism adapted to be actuated letter space distances under the control of each of said letter and figure keys, a computing mechanism including a member adapted to be set for denominational and figure values, numeral and totalizing disks in mesh therewith, a carrying device for said totalizing disks, and means to discontinue the carrying operation for all of said totalizing disks which have not actuated their carrying device.

8. In a typewriter provided with a computing mechanism, the combination with a series of letter and figure types and keys with connections to said types, of a carriage mechanism adapted to be actuated letter space distances under the control of each of said letter and figure keys, a computing mechanism including a member to be set for denominational and figure values, numeral and totalizing disks in mesh therewith, a carrying plate and coacting pawl for each of said totalizing disks, and means to discontinue the action of said pawls for each of said pawls when no carrying operation is required.

9. In a typewriter provided with a computing mechanism, the combination with a series of letter and figure types and keys with connections to said types, of a carriage mechanism adapted to be actuated letter space distances under the control of each of said letter and figure keys, a computing mechanism including a member adapted to be set for denominational and figure values comprising movable stops and loose division plates between them, and means to set said stops in accordance with whatever figure is written on the machine.

10. In a machine such as described, a series of movable stops, guides for the same, a shoulder at each end of said stops at a greater distance apart than the height of said guides and a series of loose division plates between them having shoulders corresponding approximately to the height of said guides.

11. In a typewriter provided with a computing mechanism, the combination with a series of letter and figure types and keys with connections to said types, of a carriage mechanism adapted to be actuated letter space distances under the control of each of said letter and figure keys, a computing mechanism including a member adapted to be set for denominational and figure values, a series of stops to express said values, numeral disks, a shaft therefor, and a series of washers intermediate said disks, said washers being keyed to said shaft.

12. In a typewriter provided with a computing mechanism, the combination with a series of letter and figure types and keys for connections to said types, of a carriage mechanism adapted to be actuated letter space distances under the control of each of said letter and figure keys, a computing mechanism including a member adapted to be set for denominational and figure values, a series of stops to express said values, numeral disks, a shaft therefor, and a series of washers intermediate said disks and means to arrest said disks in accordance with the setting of said stops.

13. In a typewriter provided with a computing mechanism, the combination with a series of letter and figure types and keys with connections to said types, of a carriage mechanism adapted to be actuated letter space distances under the control of each of said letter and figure keys, a computing mechanism including a member adapted to be set for denominational and figure values, a series of stops to express said values, numeral disks, a shaft therefor, and a series of washers intermediate said disks, said washers being keyed to said shaft, stepped disks and a series of intermediate parts to arrest said disks in accordance with the setting of said parts.

14. In a typewriter provided with an adding mechanism, the combination comprising a series of letter and figure types, keys having connection for actuating said types, a carriage, a mechanism controlled by each of the said keys for moving the carriage letter and figure space distances, a series of computing indicators, a driver adapted to actuate said indicators figure value distances, and locking means preventing overthrow of all the indicators said means comprising a locking radii plate and an adjustable connection between the said plate and the indicator of next higher order.

15. In a typewriter provided with an adding mechanism, the combination comprising a series of letter and figure types, keys for the same, a carriage, a mechanism controlled by each of the said keys for moving the carriage letter and figure distances, indicators, means to control the actuation of the indicators figure value distances in accordance with any of the figure keys, a carrier provided with a locking periphery, a radii plate locked thereby, clearance notchers on said periphery to allow said radii plate to pass, a connecting device between the radii plate and the adjoining indicator of the next higher order, means to make the said connecting device noneffective during the movement of said indicator in accordance with the figure key depressed and during the carrying operation and means to make the same effective to lock the indicator against overthrow upon the completion of the carrying operation.

16. In a typewriter provided with an adding mechanism, the combination comprising a series of letter and figure types, keys for the same, a carriage, a mechanism controlled by each of the said keys for moving the carriage letter and figure distances, a driven indicator, a disconnected controlling lock in mesh therewith, an intervening element between the controlling lock and the indicator of next higher order, means to cause a connection through said intervening element between the lock and the indicator of next higher order to cause the same to be moved when required and to cause the same at the end of its motion to positively stop, and means to cause the same indicator when turned a figure value distance to be free from said lock during the said figure value movement.

17. In a typewriter provided with an adding mechanism, the combination comprising a series of letter and figure types, keys for the same, a carriage, a mechanism controlled by each of the said keys for moving the carriage letter and figure distances, a series of indicators having constant uniform connections, means to operate any indicator, means to positively prevent said indicator from overthrowing at the end of its figure value operation, a positive carrier to carry the indicator of next higher order and means to positively prevent said carried indicator from moving more than the required amount.

18. In a typewriter provided with an adding mechanism, the combination comprising a series of letter and figure types, keys for the same, a carriage, a mechanism controlled by each of the said keys for moving the carriage letter and figure distances, a driven indicator, a controlling plate locked to said driven indicator but disconnected from the indicator of next higher order, an intervening element between the controlling locked plate and the indicator of next higher order, means to cause a connection through said intervening element between the locked plate and the indicator of next higher order whereby the said higher indicator shall be positioned in accordance with the position of said locked plate.

19. In a typewriter provided with an adding mechanism, the combination comprising a series of letter and figure types, keys for the same, a carriage, a mechanism controlled by each of the said keys for moving the carriage letter and figure distances, a driven indicator, a locked radii plate in constant mesh therewith, an intervening element between the locked radii plate and the indicator of next higher order, means to cause said intervening element to move the indicator of next higher order one unit when required, means to positively stop the same from moving more than one unit and means to cause the same indicator when turned a figure value distance to be free from said radii locker during the said figure valve movement but positively locked at the end of the carrying movement when it is operated by an indicator of a lower order.

20. In a typewriter provided with an adding mechanism, the combination comprising a series of letter and figure types, keys for the same, a carriage, a mechanism controlled by each of the said keys for moving the carriage letter and figure distances, indicators, a locked radii plate in mesh therewith, an intervening element between the radii plate and the indicator of next higher order, means to cause said intervening element to move the indicator of next higher order one unit when required, and means to cause the same indicator when turned a figure value distance to be free from the radii plate during the said figure value movement but positively locked at the end of the carrying movement when it is operated by an indicator of a lower order.

21. In a typewriter provided with an adding mechanism, the combination comprising a series of letter and figure types, keys for the same, a carriage, a mechanism controlled by each of the said keys for moving the carriage letter and figure distances, indicators, carriers, a series of positively locked parts in constant contact with the carriers preventing all of the indicators from being overthrown, and means to operate any indicator an amount corresponding to the figure value of any figure key.

22. In a typewriter provided with an adding mechanism, the combination comprising a series of letter and figure types, keys for the same, a carriage, a mechanism controlled by each of the said keys for moving the carriage letter and figure distances, a series of indicators, driving means therefor, a radii locker in constant mesh with the driven indicator, a controlling cam on said locker, an intervening pawl between the radii locker and the indicator of next higher order, a pusher to cause said pawl to move the indicator required, a cam to prevent the same from moving more than required and a cam to control the pawl that the said indicator may be turned a figure value distance.

23. In a typewriter provided with an adding mechanism, the combination comprising a series of letter and figure types, keys for the same, a carriage, a mechanism controlled by each of the said keys for moving the carriage letter and figure distances, a series of indicators, driving means therefor, a radii locker in mesh with the driven indicator, an intervening pawl between the radii locker and the indicator of next higher order, means to cause said pawl to move the indicator of next higher order when required, a cam to disconnect the moving means and to cause the same indicator to be turned a figure value distance.

24. In a typewriter provided with an adding mechanism, the combination comprising a series of letter and figure types, keys for the same, a carriage, a mechanism controlled by each of the said keys for moving the carriage letter and figure distances, a series of indicators, driving means therefor, a radii locker in mesh with the driven indicators, an intervening pawl between the radii locker and the indicator of next higher order, means to drive said intervening pawl to move the indicator when required, and means to positively stop the same from moving farther than the amount required.

25. In a typewriter provided with an adding mechanism, the combination comprising a series of letter and figure types, keys for the same, a carriage, a mechanism controlled by each of the said keys for moving the carriage letter and figure distances, adding-wheels, a selector having a series of stops, loose parts between said stops, and means to cause the figure keys to adjust the stops in position to engage the adding-wheels.

26. In a typewriter provided with an adding mechanism, the combination comprising a series of letter and figure types, keys for the same, a carriage, a mechanism controlled by each of the said keys for moving the carriage letter and figure distances, adding-wheels, a selector having a series of stops, loose parts between said stops, means to cause the figure keys to adjust the stops in position to control the adding-wheels, and means for moving the selector to control the actuation of the adding-wheels.

27. In a typewriter provided with an adding mechanism, the combination comprising a series of letter and figure types, keys for the same, a carriage, a mechanism controlled by each of the said keys for moving the carriage letter and figure distances, adding-wheels, a selector having a series of stops, loose parts between said stops, a spring affecting both said stops and said loose parts, means to cause the figure keys to adjust said stops in position to control the adding-wheels, and further means for moving the selector to control the actuation of the adding-wheels.

28. In a typewriter provided with an adding mechanism, the combination comprising a series of letter and figure types, keys for the same, a carriage, a mechanism controlled by each of the said keys for moving the carriage letter and figure distances, a selector carrying longitudinally movable stops, loose parts between said stops means to prevent longitudinal motion of said parts, means to cause the figure keys to adjust the stops in position to engage the adding devices, and means for moving the selector in position to control the actuation of the adding devices.

29. In a typewriter provided with an adding mechanism, the combination comprising a series of letter and figure types, keys for same, a carriage, a mechanism controlled by each of the said keys for moving the carriage letter and figure distances, a selector carrying longitudinally movable stops, loose parts having a limiting projection to hold said parts against longitudinal movement, keys to adjust the stops in position to engage the adding devices, and means for moving the selector laterally and longitudinally in position to control the actuation of the adding devices.

30. In a typewriter provided with an adding mechanism, the combination comprising a series of letter and figure types, keys for the same, a carriage, a mechanism controlled by each of the said keys for moving the carriage letter and figure distances, adding-wheels having stops thereon, a selector carrying a series of stops and movable toward and away from the adding-wheels, interponents between said two series of stops and a series of figure keys to adjust one set of the said stops.

31. In a typewriter provided with an adding mechanism, the combination comprising a series of letter and figure types, keys for the same, a carriage, a mechanism controlled by each of the said keys for moving the carriage letter and figure distances, adding-wheels, a selector carrying a series of stops movable away from and toward the adding-wheels, a series of stops on said wheels, interponents to coact between said series of stops, and keys to adjust said series of selector stops.

32. In a typewriter provided with an adding mechanism, the combination comprising a series of letter and figure types, keys for the same, a carriage, a mechanism controlled by each of the said keys for moving the carriage letter and figure distances, adding-wheels, a selector carrying a series of stops movable away from and toward the adding-wheels, a series of stops on each of said wheels, interponents to coact between said series of stops, and keys supported by a stationary keyboard to adjust said series of selector stops.

33. In a typewriter provided with an adding mechanism, the combination comprising a series of letter and figure types, keys for the same, a carriage, a mechanism controlled by each of the said keys for moving the carriage letter and figure distances, adding-wheels each having a series of stops thereon, a selector carrying a series of stops for each wheel, means whereby each figure key may be brought into operative connection with the selector stops of each series and means for causing the selector and the adding-wheels to be brought into operative relation with each other.

34. In a typewriter provided with an adding mechanism, the combination comprising a series of letter and figure types, keys for the same, a carriage, a mechanism controlled by each of the said keys for moving the carriage letter and figure distances, adding-wheels each having a series of stops thereon, a selector carrying a series of stops for each wheel, interponents to coact between said series of stops, means whereby each figure key may be brought into operative connection with the selector stops of each series and means for causing the selector and the adding-wheels to be brought into operative relation with each other.

35. In a typewriter provided with an adding mechanism, the combination comprising a series of letter and figure types, keys for the same, a carriage, a mechanism controlled by each of the said keys for moving the carriage letter and figure distances, adding indicators, a selector carrying longitudinally movable stops, loose parts between said stops having no longitudinal motion, means to cause the figure keys to adjust the stops to position to engage the indicators, and means for causing the selector to control the actuation of the indicators.

36. In a typewriter provided with an adding mechanism, the combination comprising a series of letter and figure types, keys for the same, a carriage, a mechanism controlled by each of the keys for moving the carriage letter and figure distances, adding devices, a selector carrying longitudinally movable stops, loose parts having a limiting projection to hold them against longitudinal movement, means to cause the figure keys to adjust the stops in position to engage the adding devices, and means for moving the selector up and down and longitudinally to control the actuation of the devices.

37. In a typewriter provided with an adding mechanism, the combination comprising a series of letter and figure types, keys for the same, a carriage, a mechanism controlled by each of the said keys for moving the carriage letter and figure distances, adding-wheels, a selector carrying stops, means to move said selector toward and away from the adding-wheels, means to cause the figure keys to adjust the stops for figure values and means to cause said stops to control said wheels.

38. In a typewriter provided with an adding mechanism, the combination comprising a series of letter and figure types, keys for the same, a carriage, a mechanism controlled by each of the said keys for moving the carriage letter and figure distances, adding-wheels, a selector carrying stops, means to move said selector away from and toward the adding-wheels, stops on said wheels, interponents to coact between said two sets of stops, and means to cause the figure keys to adjust the stops.

39. In a typewriter provided with an adding mechanism, the combination comprising a series of letter and figure types, keys for the same, a carriage, a mechanism controlled by each of said keys for moving the carriage letter and figure distances, adding-wheels, a selector carrying a series of stops for each wheel, means whereby each figure key may be brought into operative connection with stops of all series, and means for moving the selector into operative relation with the wheels.

40. In a typewriter provided with an adding mechanism, the combination comprising a series of letter and figure types, keys for the same, a carriage, a mechanism controlled by each of the said keys for moving the carriage letter and figure distances, a driven indicator, a disconnected controlling lock in mesh therewith, means to positively move said lock forward, an intervening element between the said controlling lock and the indicator of next higher order, means to cause through said intervening element a motion of said higher indicator, and means to cause said locker to be returned for each succeeding operation.

41. In a computing machine, the combination with an item register, of a total register, means for transferring numbers recorded in said item register into said total register, so that all the digits are simultaneously so transferred, and a carry-over mechanism for said total register operated simultaneously with the carrying of digits into said total register.

42. In a combined typewriting and computing machine, the combination with a traveling carriage, of an item register, a tabulating mechanism for said traveling carriage, means for connecting said item register to travel with said carriage by said tabulating mechanism, means automatically disconnecting said item register from said carriage when a digit is written in the units place, a total register, and means for transferring numbers from said item register into said total register.

43. In a combined typewriting and computing machine, the combination with a traveling carriage, of an item register comprising settable pins, a tabulating mechanism for connecting said item register to said traveling carriage, a total register, means for automatically disconnecting said item register from said carriage after a number is written in the units place, and means operable thereafter at the will of the operator for carrying a number so registered into the total register.

44. In a computing machine, the combination with a traveling carriage, of an item register traveling as a unit with said traveling carriage, and pins on said item register on which a number is set up.

45. In a computing machine, the combination with register wheels, of means for turning them frictionally in one direction, and means for positively turning them in the opposite direction.

46. In a combined typewriting and computing machine, the combination with a traveling carriage, of tabulating keys, tabulating levers operated by said keys, and a universal bar operated by said levers for positioning the computing mechanism with reference to the typewriting mechanism.

47. In a combined typewriting and computing machine, the combination with a traveling carriage, of an item register, a rack on said item register, a blade or tooth on said traveling carriage, and means for positioning said traveling carriage and simultaneously causing said tooth to engage said rack to properly aline the computing columns.

48. In a combined typewriting and computing machine, the combination with a traveling carriage, of an item register, means for simultaneously positioning said carriage and connecting said register thereto, and means for automatically disconnecting said register from said carriage at the end of a computing operation.

49. In a combined typewriting and computing machine, the combination with a traveling carriage, of an item register movable relatively thereto, and means for connecting said register to said carriage so as to cause a number to be added therein in the proper column.

50. In a combined typewriting and computing machine, the combination with a traveling carriage, of a rack thereon, means for positioning said carriage by said rack, an item register, a rack on said item register, and means for positioning said item register relatively to said carriage by its rack.

51. In a combined typewriting and computing machine, the combination with a traveling carriage, of an item register traveling with said carriage, an item register fixed on the frame-work of the machine, a total register, and means for recording an item in the first item register while it is traveling with said carriage, and for placing said item in the second item register and thereafter transferring it into the total register.

52. In a combined typewriting and computing machine, the combination with two item registers, of a single total register, and means for transferring an item from one item register through the other to the total register.

53. In a combined typewriting and computing machine, the combination with a traveling carriage, of a decimal tabulating mechanism for positioning said carriage, an item register, means for connecting said item register to said carriage at a point depending on where said carriage is arrested by said decimal tabulator, means for automatically disconnecting said item register from said carriage at the end of a computing operation, and a total register into which a number is later carried.

54. In a computing machine, the combination with an item register, of a total register, carry-over devices for said total register, means for positively turning the wheels of said total register by said item register, and means for causing said item register to turn said total register wheels farther whenever a carry-over device operates.

55. In a computing machine, the combination of a frame, a series of partition plates in said frame, rows of computing index pins carried by said frame and separated by said partition plates, and springs for holding the index pins, one spring for each row thereof.

56. In a computing machine, the combination of a frame, a series of partition plates in said frame, rows of computing index pins carried by said frame and separated by said partition plates, and springs for holding the index pins, one spring for each row thereof, each index pin comprising a top shoulder and a bottom shoulder spaced to allow up-and-down setting of the pins, and overhanging the partition plates to retain the pins in the frame.

57. In a computing machine, the combination of a frame, a series of partition plates in said frame, rows of computing index pins carried by said frame and separated by said partition plates, and springs for holding the index pins, one spring for each row thereof, the pins in each row being separated by division plates.

58. In a computing machine, the combination of a frame, a series of partition plates in said frame, rows of computing index pins carried by said frame and separated by said partition plates, and springs for holding the index pins, one spring for each row thereof, the pins in each row being separated by division plates; said division plates comprising upper and lower shoulders to retain them upon the partition plates.

59. In a combined typewriting and computing machine, the combination with a letter-feeding carriage, of a nest of indexing devices, and means to connect said carriage to said nest to effect step-by-step movements thereof.

60. In a combined typewriting and computing machine, the combination with a letter-feeding carriage, of a nest of indexing devices, means to connect said carriage to said nest to effect step-by-step movements thereof, said nest including a series of rows of indexing devices, and key-controlled index-setting means mounted upon the frame of the machine to be effective upon said rows in succession.

61. In a combined typewriting and computing machine, the combination with a letter-feeding carriage, of a nest of indexing devices, means to connect said carriage to said nest to effect step-by-step movements thereof, said nest including a series of rows of indexing devices, key-controlled index-setting means mounted upon the frame of the machine to be effective upon said rows in succession, said nest being normally disconnected from the carriage, and means for effecting connection between the nest and the carriage.

62. In a combined typewriting and computing machine, the combination with a letter-feeding carriage, of a nest of indexing devices, means to connect said carriage to said nest to effect step-by-step movements thereof, said nest including a series of rows of indexing devices, key-controlled index-setting means mounted upon the frame of the machine to be effective upon said rows in succession, said nest being normally disconnected from the carriage, means for effecting connection between the nest and the carriage, and automatic means for effecting disconnection between the nest and the carriage at the conclusion of the index-setting operation.

63. In a combined typewriting and computing machine, the combination with a letter-feeding carriage, of a nest of indexing devices, means to connect said carriage to said nest to effect step-by-step movements thereof, said nest including a series of rows of indexing devices, key-controlled index-setting means mounted upon the frame of the machine to be effective upon said rows in succession, said nest normally disconnected from the carriage, and means for connecting said nest to the carriage and simultaneously bringing the index pins within reach of the index-setting means.

64. In a combined typewriting and computing machine, the combination with a letter-feeding carriage, of a nest of indexing devices, means to connect said carriage to said nest to effect step-by-step movements thereof, said nest including a series of rows of indexing devices, key-controlled index-setting means mounted upon the frame of the machine to be effective upon said rows in succession, said nest being normally disconnected from the carriage, means for effecting connection between the nest and the carriage, means for disconnecting said nest, and means for returning it to normal denominational position.

65. In a combined typewriting and computing machine, the combination with a letter-feeding carriage, of a nest of indexing devices, means to connect said carriage to said nest to effect step-by-step movements thereof, said nest including a series of rows of indexing devices, key-controlled index-setting means mounted upon the frame of the machine to be effective upon said rows in succession, said nest being normally disconnected from the carriage, and means for effecting connection between the nest and the carriage, said nest being connectible to said carriage at different denominational positions.

66. In a combined typewriting and computing machine, the combination with a letter-feeding carriage, of a nest of indexing devices, means to connect said carriage to said nest to effect step-by-step movements thereof, said nest including a series of rows of indexing devices, and key-controlled index-setting means mounted upon the frame of the machine to be effective upon said rows in succession, the arrangement of such indexing devices and of such index-setting means being such that the index pins of higher denominations are set before those of lower denominations.

67. In a combined typewriting and computing machine, the combination with a letter-feeding carriage, of a nest of indexing devices, means to connect said carriage to said nest to effect step-by-step movements thereof, said nest including a series of rows of indexing devices, key-controlled index-setting means mounted upon the frame of the machine to be effective upon said rows in succession, said nest being normally disconnected from the carriage, and means for effecting connection between the nest and the carriage, said connecting means including a rack and a lug to selectively engage the rack at a distance from the units tooth in said rack equal to the number of figures in the number to be written and computed.

68. In a combined typewriting and computing machine, the combination of a typewriter carriage, a nest of indexing devices normally disconnected from said carriage, means to connect said nest to said carriage, and key-controlled means upon the machine frame for selecting and setting the indexing devices.

69. In a combined typewriting and computing machine, the combination of a typewriter carriage, a nest of indexing devices normally disconnected from said carriage, means to connect said nest to said carriage, key-controlled means upon the machine frame for selecting and setting the indexing devices, and means for automatically disconnecting the nest from the carriage.

70. In a combined typewriting and computing machine, the combination of a typewriter carriage, a nest of indexing devices normally disconnected from said carriage, means to connect said nest to said carriage, key-controlled means upon the machine frame for selecting and setting the indexing devices, and means for automatically disconnecting the nest from the carriage and returning the nest to normal denominational position.

71. In a combined typewriting and computing machine, the combination of a typewriter carriage, a nest of indexing devices normally disconnected from said carriage, means to connect said nest to said carriage, key-controlled means upon the machine frame for selecting and setting the indexing devices, and means to afford a selection of the denominational position in which the nest shall be connected to the carriage.

72. In a computing machine, the combination with a nest comprising several rows of indexing devices, of a row of index-setting devices, and means to effect step-by-step movements of said nest of indexing devices, to enable said row of setting devices to coöperate successively with the rows of indexing devices.

73. In a combined typewriting and computing machine, the combination of numeral keys, types operated by said keys, a row of index-setting devices one for each numeral key, a nest comprising rows of indexing devices, and means controlled by said keys for effecting relative movement between said indexing devices and said index-setting devices.

74. In a combined typewriting and computing machine, the combination of numeral keys, types operated by said keys, a row of index-setting devices one for each numeral key, a nest comprising rows of indexing devices, and means controlled by said keys for effecting step-by-step movement of said nest of indexing devices.

75. The combination of a letter-feeding typewriter carriage, a computing mechanism including a carriage, and means to couple said carriages for each computation, said coupling means including a rack, a coupler normally disconnected from said rack, and means for variably connecting said coupler to said rack, and for holding it in engagement therewith.

76. The combination of a letter-feeding typewriter carriage, a computing mechanism including a carriage, and means to couple said carriages for each computation, said coupling means including a rack, a coupler normally disconnected from said rack, and means for variably connecting said coupler to said rack, and for holding it in engagement therewith; said rack having teeth or lugs at letter-space intervals, and said coupler being connectible to said rack by means of any of its teeth or lugs.

77. The combination of a letter-feeding typewriter carriage, a computing mechanism including a carriage, and means to connect said carriages, including a rack and coupling means, said coupling means being capable of connection to said rack at any point in the length thereof, whereby relative adjustments may be effected between said carriages equivalent to one or more letter-spaces.

78. The combination of a letter-feeding typewriter carriage, a computing mechanism including a carriage, and means for variably connecting said carriages at letter-space intervals, including a series of teeth or lugs arranged at letter-space intervals and coupling means engageable with any of said teeth or lugs.

79. The combination of a letter-feeding typewriter carriage, a computing mechanism including a carriage normally disconnected from the typewriter carriage, and means for connecting said carriages together for each computation; said connecting means including means whereby the relationship between the carriages may be varied one or more letter-spaces as required.

80. The combination of a letter-feeding typewriter carriage, a computing mechanism including a carriage normally disconnected from the typewriter carriage, means for connecting said carriages together for each computation; said connecting means including means whereby the relationship between the carriages may be varied one or more letter-spaces as required, and means dependent upon the movement of the typewriter carriage, for automatically uncoupling said carriages.

81. The combination of a letter-feeding typewriter carriage, a computing mechanism including a carriage normally disconnected from the typewriter carriage, means for connecting said carriages together for each computation; said connecting means including means whereby the relationship between the carriages may be varied one or more letter-spaces as required, means dependent upon the movement of the typewriter carriage, for automatically uncoupling said carriages, and means to return the computing carriage to normal position independently of the typewriter carriage.

82. The combination of a letter-feeding typewriter carriage, a computing mechanism including a carriage, means to couple said carriages for each computation, said coupling means including a rack, a coupler normally disconnected from said rack, and means for variably connecting said coupler to said rack, and for holding it in engagement therewith, and means to disconnect said carriages.

83. The combination of a letter-feeding typewriter carriage, a computing mechanism including a carriage, means to couple said carriages for each computation, said coupling means including a rack, a coupler normally disconnected from said rack, and means for variably connecting said coupler to said rack, and for holding it in engagement therewith, means to disconnect said carriages, and means to return the computing carriage to normal position independently of the typewriter carriage.

84. The combination of a letter-feeding typewriter carriage, a computing mechanism including a carriage, means for variably connecting said carriages at letter-space intervals, including a series of teeth or lugs arranged at letter-space intervals and coupling means engageable with any of said teeth or lugs, and means to disconnect said carriages.

85. The combination of a letter-feeding typewriter carriage, a computing mechanism including a carriage, means for variably connecting said carriages at letter-space intervals, including a series of teeth or lugs arranged at letter-space intervals and coupling means engageable with any of said teeth or lugs, means to disconnect said carriages, and means to return the computing carriage to normal position independently of the typewriter carriage.

86. The combination of a letter-feeding typewriter carriage movable into and out of a computing zone, a computing mechanism including a carriage normally disconnected from said typewriter carriage, and means to enable said carriages to be coupled together when the typewriter carriage is in the computing zone, said coupling means including means to permit a variation of one or more letter-spaces in the relative positions of the coupled carriages.

87. The combination of a letter-feeding typewriter carriage movable into and out of a computing zone, a computing mechanism including a carriage normally disconnected from said typewriter carriage, means to enable said carriages to be coupled together when the typewriter carriage is in the computing zone, said coupling means including means to permit a variation of one or more letter-spaces in the relative positions of the coupled carriages; said computing carriage having a nest of indexing devices, a row of index-setters mounted upon the machine frame, and numeral keys connected to said index-setters.

88. The combination of a letter-feeding typewriter carriage, a set of numeral keys controlling said carriage, types operated by said numeral keys, a nest of indexing devices, a row of index-setters connected to said keys, and means to enable said typewriter carriage to effect relative denominational movement between the row of index-setters and the nest of indexing devices.

89. The combination of a letter-feeding typewriter carriage, a set of numeral keys controlling said carriage, types operated by said numeral keys, a nest of indexing devices, a row of index-setters connected to said keys, and means for connecting said nest of indexing devices to said typewriter carriage to travel therewith.

90. The combination of a set of type-operating numeral keys, a typewriter carriage controlled by said keys, a computing carriage having a nest of indexing devices, means to connect said carriages, and a row of index-setters connected to said keys.

91. The combination of a set of type-operating numeral keys, a typewriter carriage controlled by said keys, a computing carriage having a nest of indexing devices, means to connect said carriages, a row of index-setters connected to said keys, and means dependent upon the movement of the typewriter carriage for disconnecting said carriages.

92. The combination of a set of numeral keys, types operated thereby, index-setting devices connected one to each key, a nest of indexing devices, and means controlled by said keys for effecting relative traveling movement between said nest of indexing devices and said index-setting devices.

93. The combination of a letter-feeding typewriter carriage movable into and out of a computing zone, a computing mechanism including a carriage normally disconnected from said typewriter carriage, means to enable said carriages to be coupled together when the typewriter carriage is in the computing zone, said coupling means including means to permit a variation of one or more letter-spaces in the relative positions of the coupled carriages, and means dependent upon the movement of the typewriter carriage for disconnecting said carriages.

94. The combination of a series of numeral keys, a nest comprising rows of indexing devices, a row of index-setters connected respectively to the keys, means under the control of said keys for effecting relative denominational movement between the nest of indexing devices and the row of index-setters, a set of wheels corresponding to the rows of indexing devices in said nest, stepped devices individual to said wheels, for arresting the wheels in different positions, means to enable said indexing devices to coöperate with said stepped devices to arrest the wheels, and means for turning the wheels until respectively arrested by the stepped devices.

95. The combination of a series of numeral keys, a nest comprising rows of indexing devices, a row of index-setters connected respectively to the keys, means under the control of said keys for effecting relative denominational movement between the nest of indexing devices and the row of index-setters, a set of wheels corresponding to the rows of indexing devices in said nest, stepped devices individual to said wheels, for arresting the wheels in different positions, means to enable said indexing devices to coöperate with said stepped devices to arrest the wheels, means for turning the wheels until respectively arrested by the stepped devices, a set of dial wheels forming a register or totalizer, means to effect connection and disconnection of the dial wheels with the first-mentioned wheels, and means for returning the first-mentioned wheels to normal positions.

96. The combination of a series of numeral keys, a nest comprising rows of indexing devices, a row of index-setters connected respectively to the keys, means under the control of said keys for effecting relative denominational movement between the nest of indexing devices and the row of index-setters, a set of wheels corresponding to the rows of indexing devices in said nest, said wheels provided with dials thereon, stepped devices individual to said wheels, for arresting the wheels in different positions, means to enable said indexing devices to coöperate with said stepped devices to arrest the wheels, and means for turning the wheels until respectively arrested by the stepped devices.

97. The combination of a series of numeral keys, a nest comprising rows of indexing devices, a row of index-setters connected respectively to the keys, means under the control of said keys for effecting relative denominational movement between the nest of indexing devices and the row of index-setters, a set of wheels corresponding to the rows of indexing devices in said nest, stepped devices individual to said wheels, interponents between said stepped devices and said indexing devices, means for moving said interponents until respectively arrested by the set indexing devices, and means for turning the wheels until respectively arrested by the stepped devices and interponents.

98. The combination of a series of numeral keys, a nest comprising rows of indexing devices, a row of index-setters connected respectively to the keys, means under the control of said keys for effecting relative denominational movement between the nest of indexing devices and the row of index-setters, a set of wheels corresponding to the rows of indexing devices in said nest, stepped devices individual to said wheels, interponents between said stepped devices and said indexing devices, means for moving said interponents until respectively arrested by the set indexing devices, means for turning the wheels until respectively arrested by the stepped devices and interponents, dial wheels operable by the first-mentioned wheels, and means for returning the first-mentioned wheels to normal positions and restoring said interponents.

99. The combination of a set of ten numeral keys numbered from "0" to "9", a nest comprising rows of indexing devices, a row of nine index-setters connected respectively to the keys from "0" to "8", means under the control of said keys for effecting relative denominational movement between the nest of indexing devices and the row of index-setters, a set of wheels corresponding to the rows of indexing devices in said nest, stepped devices individual to said wheels and each comprising steps for arresting its wheel in any position from "0" to "8", arms or interponents between said stepped devices and said indexing devices, means for moving said interponents until respectively arrested by the set indexing devices, and means for turning the wheels until respectively arrested by the stepped devices and interponents; said interponents movable clear of said stepped devices unless arrested by said indexing devices, and said wheels being movable nine steps when not arrested by engagement of the stepped devices with the interponents.

100. The combination of a set of ten numeral keys numbered from "0" to "9", a nest comprising rows of indexing devices, a row of nine index-setters connected respectively to the keys from "0" to "8", means under the control of said keys for effecting relative denominational movement between the nest of indexing devices and the row of index-setters, a set of wheels corresponding to the rows of indexing devices in said nest, stepped devices individual to said wheels and each comprising steps for arresting its wheel in any position from "0" to "8", arms or interponents between said stepped devices and said indexing devices, means for moving said interponents until respectively arrested by the set indexing devices, means for turning the wheels until respectively arrested by the stepped devices and interponents; said interponents movable clear of said stepped devices unless arrested by said indexing devices, and said wheels being movable nine steps when not arrested by engagement of the stepped devices with the interponents, dial wheels operable by the first-mentioned wheels, and means for returning the first-mentioned wheels to normal positions and restoring said interponents.

101. The combination of a series of numeral keys, a nest comprising rows of indexing devices, a row of index-setters connected respectively to the keys, means under the control of said keys for effecting relative denominational movement between the nest of indexing devices and the row of index-setters, a set of wheels corresponding to the rows of indexing devices in said nest, stepped devices individual to said wheels, interponents between said stepped devices and said indexing devices, means for moving said interponents until respectively arrested by the set indexing devices, means for turning the wheels until respectively arrested by the stepped devices and interponents, said nest and said interponents being relatively movable to different denominational positions, whereby certain interponents are rendered idle, and means for preventing movement of the idle interponents.

102. The combination of a set of ten numeral keys numbered from "0" to "9", a nest comprising rows of indexing devices, a row of nine index-setters connected respectively to the keys from "0" to "8", means under the control of said keys for effecting relative denominational movement between the nest of indexing devices and the row of index-setters, a set of wheels corresponding to the rows of indexing devices in said nest, stepped devices individual to said wheels and each comprising steps for arresting its wheel in any position from "0" to "8", arms or interponents between said stepped devices and said indexing devices, means for moving said interponents until respectively arrested by the set indexing devices, means for turning the wheels until respectively arrested by the stepped devices and interponents; said interponents movable clear of said stepped devices unless arrested by said indexing devices, and said wheels being movable nine steps when not arrested by engagement of the stepped devices with the interponents, said nest and said interponents being relatively movable to different denominational positions, whereby certain interponents are rendered idle, and means for preventing movement of the idle interponents.

103. In a computing machine, the combination of a shaft, means to rotate the shaft, a set of computing wheels on said shaft and frictionally connected thereto, stepped devices connected with said wheels individually, and adjustable means to coöperate with said stepped devices for arresting the wheels in various positions.

104. In a computing machine, the combination of a shaft, means to rotate the shaft, a set of computing wheels on said shaft and and frictionally connected thereto, stepped devices connected with said wheels individually, adjustable means to coöperate with said stepped devices for arresting the wheels in various positions, and computing pinions movable into mesh with said wheels to be driven thereby.

105. In a computing machine, the combination of a shaft, means to rotate the shaft, a set of computing wheels on said shaft and frictionally connected thereto, stepped devices connected with said wheels individually, adjustable means to coöperate with said stepped devices for arresting the wheels in various positions, computing pinions movable into mesh with said wheels to be driven thereby, and means to return said first-mentioned wheels to normal positions.

106. In a computing machine, the combination with a computing pinion and a driving gear therefor normally out of mesh therewith, of a key, mechanism connected to said key for effecting an intermeshing movement of the driving gear and pinion, a turning of the driving gear when in mesh with the pinion, a separation of the driving gear and pinion, and a turning of the driving gear in the opposite direction when out of mesh with the pinion, and an indexing device for controlling the extent of drive of said driving gear.

107. In a computing machine, the combination with a computing pinion, of a driving gear normally out of mesh with said pinion, indexing means for said driving gear, mechanism to effect meshing of said gear and pinion and also driving of the pinion by the gear to an extent determined by the indexing devices, means for effecting unmeshing of the gear and pinion, and means for turning the gear when out of mesh with the pinion.

108. In a computing machine, the combination of a computing pinion, a driving gear normally out of mesh therewith, indexing devices, a key, means for meshing and unmeshing the gear and pinion, and means for rotating said driving gear when in mesh with said pinion, and when out of mesh with said pinion; all of said meshing, unmeshing and rotating means being dependent upon the movements of said key, whereby said pinion may be rotated upon the operation of said key to an extent determined by the indexing devices.

109. In a computing machine, the combination with a computing pinion and a driving gear therefor normally out of mesh therewith, of a key, said gear and pinion shiftable into and out of mesh by said key, means to enable the key when moving in one direction to maintain said gear and pinion in mesh, and when moving in the opposite direction to maintain them out of mesh, means to enable said key to rotate said driving gear in one direction when it is out of mesh with the pinion, and in the opposite direction when it is in mesh with the pinion, and an indexing device for controlling the extent of drive of said driving gear.

110. In a computing machine, the combination with a set of computing pinions and a set of driving gears therefor normally out of mesh therewith, of a key, said gears and pinions shiftable into and out of mesh by said key, means to enable the key when moving in one direction to maintain said gears and pinions in mesh, and when moving in the opposite direction to maintain them out of mesh, means to enable said key to rotate said driving gears in one direction when they are out of mesh with the pinions, and in the opposite direction when they are in mesh with the pinions, and a set of indexing devices for controlling the extents of drive of said driving gears.

111. In a computing machine, the combination with a set of computing pinions and a set of driving gears therefor normally out of mesh therewith, of a key, mechanism operated by said key for effecting intermeshing of the gears and pinions, turning of the gears when in mesh with the pinions, separation of the gears and pinions, and turning of the gears in the opposite direction when out of mesh with the pinions, and a set of indexing devices for controlling the extents of drive of said driving gears.

112. In a computing machine, the combination of a part movable to different positions for selecting the denominations to be computed; means to control the to and fro movements of said part; said means including a carriage, and also including a latch or hook, and also including a lever pivoted between its ends and connected at one end to said latch or hook; and computing mechanism including parts connected to the other end of said lever.

113. In a computing machine; the combination of a part movable to different positions for selecting the denominations to be computed; means to control the to and fro movements of said part; said means including a carriage, and also including a latch or hook, and also including a lever pivoted between its ends and connected at one end to said latch or hook; computing mechanism including parts connected to the other end of said lever; and means for causing the latch or hook to release said denomination-selecting member.

114. In a computing machine, the combination of a reciprocable part for selecting the denominations to be computed, means for effecting a movement of said part, including a latch or hook, and also including a lever pivoted between its ends and connected at one end to said latch or hook, and computing mechanism including parts connected to the other end of said lever.

115. In a computing machine, the combination of a reciprocable part for selecting the denominations to be computed, means for effecting a movement of said part, including a latch or hook, and also including a lever pivoted between its ends and connected at one end of said latch or hook, computing mechanism including parts connected to the other end of said lever, and means for automatically effecting disconnection of said hook and said denomination-selecting part.

116. In a computing machine, the combination of a reciprocable part for selecting the denominations to be computed, means for effecting a movement of said part, including a latch or hook, and also including a lever pivoted between its ends and connected at one end to said latch or hook, computing mechanism including parts connected to the other end of said lever, and means for automatically effecting connection and disconnection of said hook and said denomination-selecting part.

117. In a combined typewriting and computing machine, the combination of a typewriter carriage, a computer carriage, a device for coupling said carriages, a finger-piece, and means operated by said finger-piece to move said coupling device to uncoupling position.

118. In a combined typewriting and computing machine, the combination of a typewriter carriage, a computer carriage, a device for coupling said carriages, a finger-piece, means operated by said finger-piece to move said coupling device to uncoupling position, and a punctuation type operable by said finger-piece.

119. In a combined typewriting and computing machine, the combination of a typewriter carriage, a denomination-controlling device, means for coupling said denomination-controlling device to said carriage, a finger-piece, and means operated by said finger-piece to move said coupling means to uncoupling position.

120. In a combined typewriting and computing machine, the combination of a typewriter carriage, a denomination-controlling device, numeral keys to control said carriage, a punctuation key also controlling said carriage, means to connect said carriage and said denomination-controlling device, and means dependent upon the operation of said punctuation key for causing movement of said carriage independently of said controlling device.

121. In a combined typewriting and computing machine, the combination of a typewriter carriage, a set of numeral type keys to control said carriage, denomination-controlling means connected to said carriage, a punctuation type key, and means to enable said punctuation key to effect a movement of said carriage without effecting a corresponding change of the denomination-controlling means, whereby the written numbers may be separated into groups on the worksheet without a corresponding grouping of the number wheels.

122. In a combined typewriting and computing machine, the combination with numeral type keys and a carriage controlled thereby, of a set of number wheels, means to coöperate with said keys and said carriage to set up on said number wheels a number represented by the keys depressed, a totalizer including number wheels, and mechanism for transferring numbers from the first set of number wheels in said totalizer and returning to zero the wheels in said first set.

123. In a combined typewriting and adding machine, the combination of a carriage for a typewriter, a step-by-step moving denomination selecting device for the adding machine, means whereby said denomination selecting device is controlled by said carriage, means for imparting a step-by-step motion to said typewriter carriage and denomination selecting device, and means for arresting the step-by-step motion of said denomination selecting mechanism momentarily without preventing the stepping of the typewriter carriage.

124. In an adding machine, the combination of a register, a series of keys, devices controlled by said keys for setting up a number to be added on said register, mechanism for operating said register in accordance with the number set up on said setting-up devices, a shield for said register, and means to enable said operating mechanism to effect relative movement between the register and the shield, to and from a position in which the shield obstructs the view of the register.

125. In an adding machine, the combination of a register, a series of keys, devices controlled by said keys for setting up a number to be added on said register, mechanism for operating said register in accordance with the number set up on said setting-up devices, a shield for said register, said register and shield being relatively movable to such a position that the shield obstructs the view of the register, and mechanism to effect a relative movement between the shield and register to restore them to normal relative position.

126. In an adding machine, the combination of a register, mechanism for controlling said register, said controlling mechanism including means for setting up a number to be added on said register, and also including mechanism for operating the register in accordance with the number set up, a shield for said register, and means connected to said controlling mechanism for effecting relative movement between the shield and the register from normal position to a position in which the shield obstructs the view of the register, and back again to normal position.

127. In an adding machine, the combination of a register, setting-up devices including racks, keys for controlling said setting-up devices, and an operating mechanism including means for throwing said register and said racks into and out of gear, means for operating said racks to operate the register after said racks are in gear with the register, and means for disconnecting the register and the racks near the end of an operation of said operating mechanism and before said rack operating means is allowed to return to normal position.

128. In an adding machine, the combination of a register, keys, setting-up devices controlled by said keys and including a series of racks, means for allowing to any one of said racks an additional increment of motion to transfer, an operating mechanism including means for bringing said register and said racks into gear, means operating after the last recited means to operate said racks and register, and means for holding said rack-operating means in its extreme operated position until the register and the racks have been disconnected, and for restoring said rack-operating means to normal position.

129. In an adding machine, the combination of a register, setting-up devices including a series of racks, means for imparting to any of said racks upon occasion an additional increment of motion to transfer, an operating handle having a positive and a return stroke, means operated by said operating handle to bring said register and said racks into gear and then to operate said register and racks, and means operated near the end of the return stroke of said operating handle for releasing said racks from said register.

130. In an adding machine, the combination of a register, a series of operating racks for said register, an operating handle having a positive and a return stroke, a rock shaft operated by said operating handle, a cam on said rock shaft, means operated by said cam for bringing said register and said racks into gear, and for holding them in gear until the last part of the return stroke of the handle, means controlled by said handle for operating said racks and register, and means for returning said racks after the register and racks have been disconnected.

131. In an adding machine, the combination of a register including register wheels, drivers for said register wheels normally out of gear with said register wheels, means for actuating said drivers to set up a number to be added, and operating mechanism comprising means for bringing said register wheels and drivers into gear and holding them in gear, for operating said drivers in accordance with the number set up, for moving said register wheels and drivers out of gear, and for restoring said drivers to normal position, all in one operation of said operating mechanism.

132. In an adding machine, the combination of a register, racks for operating said register, said racks and register being normally out of gear, means for setting said racks in accordance with numbers to be added, and adding mechanism including a cam having a positive and a return stroke, said cam operating to bring the register and racks into gear, and having a dwell arranged to hold said register and racks in gear until the last part of the return stroke of said cam.

133. In a combined typewriting and computing machine, the combination of a set of type-operating numeral keys, a denomination selecting mechanism under the control of said keys, a set of driving gears or racks, spring-operated members movable different distances as determined by said keys, and having means for determining the extent of rotation of said driving gears or racks, and a register or totalizer having wheels operable by said driving gears or racks.

134. The combination of computing devices comprising denomination-determining devices inclusive of a carriage, type-operating numeral keys, computing mechanism controllable by said keys, means being controlled by said keys for imparting a step-by-step motion to said carriage, and a special type key for writing a punctuation point, said carriage being operable by said punctuation key, without effecting a change in the denominational position of the computing mechanism.

BENJAMIN M. Des JARDINS.

Witnesses:
JOHN WILSON DROWN,
D. T. SEESEY.